US012557918B2

(12) United States Patent
Feng

(10) Patent No.: US 12,557,918 B2
(45) Date of Patent: Feb. 24, 2026

(54) 3D SEA WAVE SHAPE POLYURETHANE FOAM FOR USE IN PET BED/CUSHION

(71) Applicant: Comfy Tails LLC, Westborough, MA (US)

(72) Inventor: David Feng, Nantong (CN)

(73) Assignee: COMFY TAILS LLC, Westborough, MA (US)

( * ) Notice: Subject to any disclaimer, the term of this patent is extended or adjusted under 35 U.S.C. 154(b) by 0 days.

(21) Appl. No.: 18/798,722

(22) Filed: Aug. 8, 2024

(65) Prior Publication Data

US 2025/0049227 A1 Feb. 13, 2025

Related U.S. Application Data

(60) Provisional application No. 63/519,632, filed on Aug. 15, 2023, provisional application No. 63/518,976, filed on Aug. 11, 2023.

(51) Int. Cl.
| | |
|---|---|
| *A47C 27/14* | (2006.01) |
| *A01K 1/035* | (2006.01) |
| *A47C 31/10* | (2006.01) |

(52) U.S. Cl.
CPC .......... *A47C 27/144* (2013.01); *A01K 1/0353* (2013.01); *A47C 31/105* (2013.01)

(58) Field of Classification Search
CPC .... A01K 1/0353; A47C 27/142; A47C 27/146
USPC ......................................... 5/652.1, 736, 740
See application file for complete search history.

(56) References Cited

U.S. PATENT DOCUMENTS

| | | | | |
|---|---|---|---|---|
| 3,197,357 A | * | 7/1965 | Schulpen | A47C 27/144 83/17 |
| 3,258,791 A | * | 7/1966 | Kaplan | A47C 27/15 5/736 |
| 4,276,666 A | * | 7/1981 | Yamada | A47C 27/144 5/736 |
| 4,686,725 A | * | 8/1987 | Mitchell | A47C 21/022 5/736 |
| 5,172,436 A | * | 12/1992 | Masuda | A47C 27/15 5/736 |
| 8,209,804 B2 | * | 7/2012 | Apperson | A47C 27/146 5/691 |
| 2019/0358577 A1 | * | 11/2019 | Twining | B32B 3/08 |
| 2022/0079112 A1 | * | 3/2022 | Oaten | A01K 1/015 |

* cited by examiner

*Primary Examiner* — Kimberly S Berona
*Assistant Examiner* — Nevena Aleksic
(74) *Attorney, Agent, or Firm* — Adler Pollock & Sheehan P.C.

(57) ABSTRACT

A pet bed cushion is disclosed, comprising a bottom foam support base and an upper layer featuring a series of zig-zagging Z-shaped air valleys or channels separated by tapering walls with varying thicknesses. The tapering walls offer increasing support as they compress under the pet's weight, creating a three-dimensional sea wave appearance. The design of the zig-zagging Z-shaped air channels, along with the tapering walls, promotes comforting and cooling airflow beneath the pet when resting on the mattress. This innovative structure provides enhanced comfort and support for pets, ensuring a restful and cooling experience.

20 Claims, 24 Drawing Sheets top view 375
370 left view 375
370 front view 375
370 right view 375
370 back view bottom view

3D Sea Wave Pet Bed
Mattress - Orthopedic
Foam

3D Sea Wave Pet Bed
Mattress - Orthopedic
Cloudy Gel Memory Foam

3D Sea Wave Shape
Foam

3D Sea Wave Shape
Cloudy Gel Memory Foam

420

430

430

440

435

3D Sea Wave Foam
with Gel infused Memory Foam

430

Cloudy Gel
Memory Foam

440

450

430

(airflow under body)

Soft Fabric

460

451

(maintains airflow under body)

461

Linen Type Fabric

Excellent Support for older or ailing pets.
Perfect for joint support.

Cooling Gel Pad

500

Memory Foam

Blend of Poly Fill and
Shredded Cooling Gel
Memory Foam

460
375
370
462

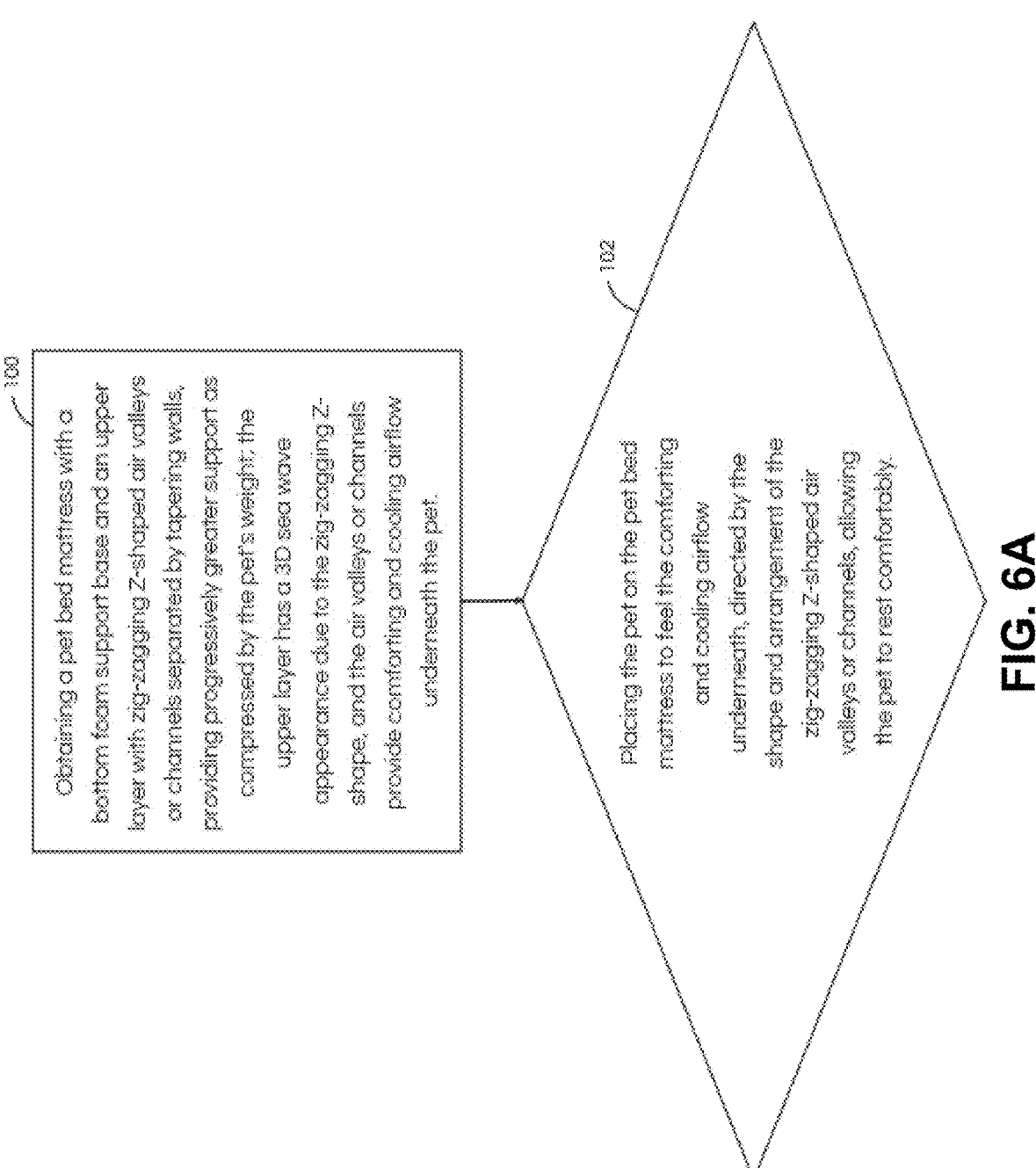

100

Obtaining a pet bed mattress with a bottom foam support base and an upper layer with zig-zagging Z-shaped air valleys or channels separated by tapering walls, providing progressively greater support as compressed by the pet's weight; the upper layer has a 3D sea wave appearance due to the zig-zagging Z-shape, and the air valleys or channels provide comforting and cooling airflow underneath the pet.

102

Placing the pet on the pet bed mattress to feel the comforting and cooling airflow underneath, directed by the shape and arrangement of the zig-zagging Z-shaped air valleys or channels, allowing the pet to rest comfortably.

FIG. 6A to FIG. 6C →

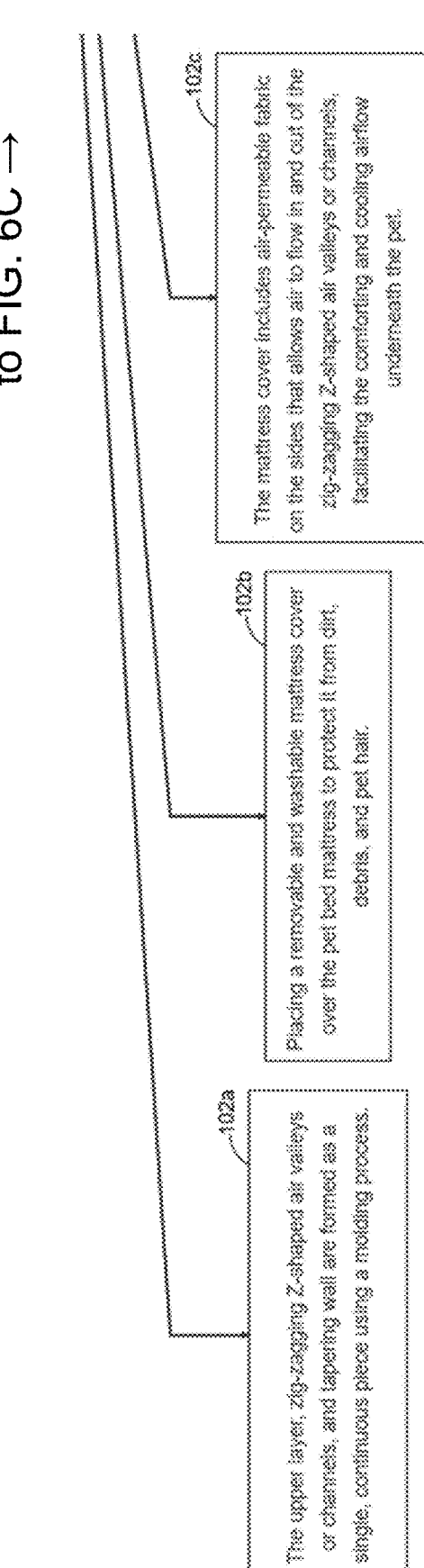

The upper layer, zig-zagging Z-shaped air valleys or channels, and tapering wall are formed as a single, continuous piece using a molding process.

Placing a removable and washable mattress cover over the pet bed mattress to protect it from dirt, debris, and pet hair.

The mattress cover includes air-permeable fabric on the sides that allows air to flow in and out of the zig-zagging Z-shaped air valleys or channels, facilitating the comforting and cooling airflow underneath the pet.

FIG. 6B (left)

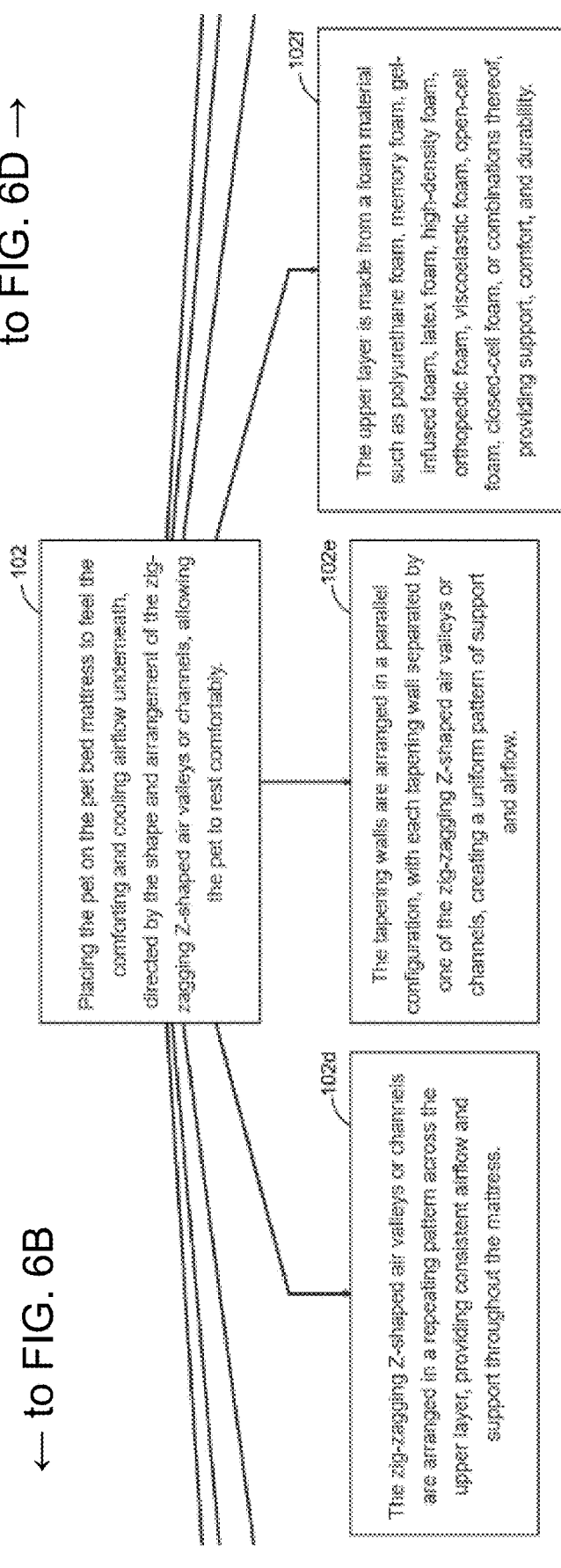

The upper layer is made from a foam material such as polyurethane foam, memory foam, gel-infused foam, latex foam, high-density foam, orthopedic foam, viscoelastic foam, open-cell foam, closed-cell foam, or combinations thereof, providing support, comfort, and durability.

102

Placing the pet on the pet bed mattress to feel the comforting and cooling airflow underneath, directed by the shape and arrangement of the zig-zagging Z-shaped air valleys or channels, allowing the pet to rest comfortably.

102e

The tapering walls are arranged in a parallel configuration, with each tapering wall separated by one of the zig-zagging Z-shaped air valleys or channels, creating a uniform pattern of support and airflow.

102d

The zig-zagging Z-shaped air valleys or channels are arranged in a repeating pattern across the upper layer, providing consistent airflow and support throughout the mattress.

FIG. 6C (middle)

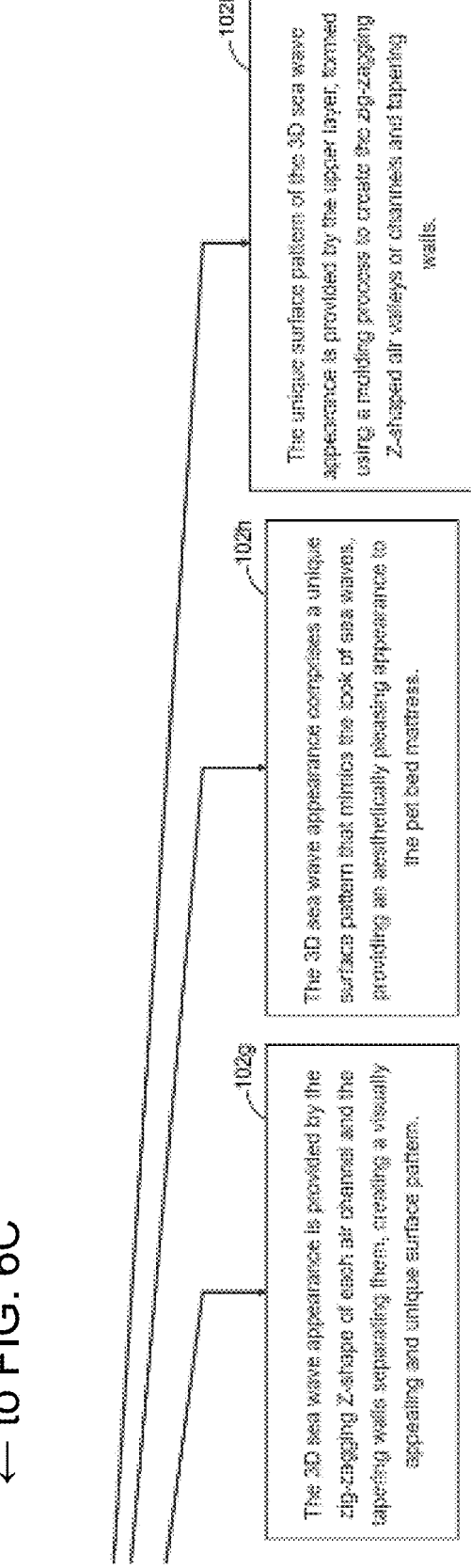
← to FIG. 6C
FIG. 6D (right)

3D SEA WAVE SHAPE POLYURETHANE FOAM FOR USE IN PET BED/CUSHION

CROSS-REFERENCE TO RELATED APPLICATIONS

This application claims the benefit of priority to U.S. Provisional Patent No. 63/518,976, filed on 11 Aug. 2023, the entirety of which is incorporated by reference as if fully reproduced and set forth herein in its entirety. This application also claims the benefit of priority to U.S. Provisional Patent No. 63/519,632, filed on 15 Aug. 2023, the entirety of which is incorporated by reference as if fully reproduced and set forth herein in its entirety.

FIELD OF THE INVENTION

The embodiments of the present invention relate to bed cushions and more particularly to a three-dimensional (3D) sea wave shape foam for use in a pet bed/cushion, along with methods including steps for putting a pet to a comfortable position on the bed/cushion.

BACKGROUND OF THE INVENTION

In general, there are countless pet beds on the market, many of which have enjoyed considerable commercial success. Such beds are typically made of an outer fabric cover or duvet that is sewn in a manner that imparts a desired bed shape that is filled internally with a fill. The filling materials of a pet bed or a nest mat on the existing market are mainly polypropylene (PP) cotton, cotton, foam particles, sponges and other materials, of which similar products filled with PP sponge and sponge are more popular. A PP padded pad has poor air permeability, sultry, weak support, and is a traditional filling material. After the 1990s, pet pads filled with sponge became more and more popular with pets, because the sponge material has the advantages of good support, flexible feet, and is not easy to deform. But there are also some problems that cannot be solved, e.g., once the pet stays or sleeps on these mats for a long time, the traditional shape of the sponge does not have the function of long-term heat dissipation. What is urgently needed is a design that provides air flow when the pet's body is in contact with the surface of the pet bed or mat.

BRIEF SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Previous approaches to pet bed mattresses have typically focused on providing basic cushioning, fur capture, and support for pets without considering the specific needs for airflow and cooling. Conventional pet bed mattresses often consist of a simple foam base with a fabric or cushioned top layer, which may provide comfort but lack features designed to enhance airflow and cooling for the pet. These conventional pet bed mattresses may not adequately address the need for temperature regulation, especially for pets that are prone to overheating or discomfort due to lack of ventilation.

Pet bed prototypes tested herein have incorporated raised or textured surfaces to promote airflow and circulation underneath the pet. These designs may include raised bumps, ridges, or grooves on the surface of the mattress to create air channels. While these features may help to some extent in providing ventilation, they may not offer a comprehensive solution for maximizing airflow and cooling for the pet. Testing on actual pets has led to the discoveries disclosed herein.

Other pet bed mattresses may utilize materials with inherent cooling properties, such as gel-infused foam or cool floors to address the issue of temperature regulation. While these materials can help in dissipating heat and providing a cooler sleeping surface for the pet, they may not offer targeted support and airflow control to ensure optimal comfort for the pet. Moreover, the design of these mattresses may not specifically address the need for a structured airflow pattern that promotes comfort and relaxation for the pet. However, none of these approaches have provided a comprehensive solution that combines the features described in this disclosure.

The first problem is that pets have fur, and the pets tend to get overheated when lying or sleeping on a material pet bed mattress to the present Invention provides a comforting and cooling airflow underneath the pet when the pet's body is lying on the mattress and another problem is that placing a mattress cover on a pet mattress eliminates airflow underneath the pet so the present invention also provides capability to place a mattress cover over the pet bed mattress and maintain the comforting and cooling airflow underneath the pet when the pet's body even with a mattress cover.

In some embodiments, a solution is provided using a pet bed mattress with zig-zagging Z-shaped air valleys including a bottom foam support base and an upper layer comprising a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress; wherein the pet bed mattress is provided with a mattress cover including an air-permeable fabric on the sides of the mattress cover that allows the comforting and cooling airflow underneath the pet when the mattress cover is placed over the pet bed mattress.

The technology disclosed herein 1) provides progressively greater support for a pet's body as each tapering wall is compressed by the weight of the pet's body, 2) provides a comforting and cooling airflow underneath the pet when the pet's body is lying on the mattress, and optionally can provide these with a special air-flow mattress cover disclosed herein.

According to some aspects, the pet bed mattress includes a bottom foam support base; the upper layer comprises a plurality of zig-zagging Z-shaped air valleys or channels each separated by a tapering wall with a thinner top thickness and a thicker bottom thickness; each tapering wall provides progressively greater support for a pet's body as each tapering wall is compressed by the weight of the pet's body; the upper layer provides a sea wave appearance due to a zig-zagging Z-shape of each zig-zagging Z-shaped air channel along with each separated by the tapering wall; each of the zig-zagging Z-shaped air valleys or channels provides a comforting and cooling airflow underneath the pet when the pet's body is lying on the mattress; and the pet bed mattress is provided with a mattress cover including an air-permeable fabric on the sides of the mattress cover that allows the comforting and cooling airflow underneath the pet when the mattress cover is placed over the pet bed mattress.

The use of zig-zagging Z-shaped air valleys or channels separated by tapering walls that provide progressively greater support and cooling airflow is completely new and pleasing to pets.

In an example brief summary, the technology disclosed herein can be discussed with the following list of features:

Feature 1: A pet bed mattress including a bottom foam support base and an upper layer comprising a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a three-dimensional (3D) sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress.

Feature 2: The pet bed mattress of feature 1, further comprising a mattress cover with air-permeable fabric on the sides that allows the comforting and cooling airflow underneath the pet when the mattress cover is placed over the pet bed mattress.

Feature 3: The pet bed mattress of feature 1, wherein the upper layer comprises a compressible foam material.

Feature 4: The pet bed mattress of feature 1, wherein the zig-zagging Z-shaped air valleys or channels are shaped to provide airflow for comfort and cooling.

Feature 5: The pet bed mattress of feature 2, wherein the air-permeable fabric on the sides of the mattress cover comprises at least one of a mesh material, a perforated material, a breathable synthetic fabric, a breathable natural fabric, or a moisture-wicking fabric.

Feature 6: The pet bed mattress of feature 3, wherein the compressible material of the tapering wall is compressible by the weight of the pet's body.

Feature 7: The pet bed mattress of feature 4, wherein the shaped air channels of the zig-zagging Z-shaped air valleys or channels provide airflow for comfort and cooling to the pet.

Feature 8: The pet bed mattress of feature 5, wherein the breathable material on the sides of the mattress cover allows airflow underneath the pet.

Feature 9: The pet bed mattress of feature 1, wherein the bottom foam support base comprises a supportive material.

Feature 10: The pet bed mattress of feature 9, wherein the supportive material of the bottom foam support base provides support and comfort to the pet bed mattress.

Feature 11: The pet bed mattress of feature 6, wherein the varying thickness of the tapering wall is compressible by the weight of the pet's body to provide progressively greater support.

Feature 12: The pet bed mattress of feature 1, wherein the upper layer, the zig-zagging Z-shaped air valleys or channels, and the tapering wall are formed as a single, continuous piece.

Feature 13: The pet bed mattress of feature 2, wherein the mattress cover is removable and washable.

Feature 14: The pet bed mattress of feature 2, wherein the air-permeable fabric on the sides of the mattress cover allows air to flow in and out of the zig-zagging Z-shaped air valleys or channels.

Feature 15: The pet bed mattress of feature 1, wherein the zig-zagging Z-shaped air valleys or channels are arranged in a repeating pattern across the upper layer.

Feature 16: The pet bed mattress of feature 1, wherein the tapering walls are arranged in a parallel configuration, with each tapering wall separated by one of the zig-zagging Z-shaped air valleys or channels.

Feature 17: The pet bed mattress of feature 1, wherein the upper layer is made from a foam material comprising at least one of polyurethane foam, memory foam, gel-infused foam, latex foam, orthopedic cloudy gel memory foam, high-density foam, or an orthopedic foam.

Feature 18: The pet bed mattress of feature 1, wherein the three-dimensional (3D) sea wave appearance is provided by the zig-zagging Z-shape of each air channel and the tapering walls separating them.

Feature 19: The pet bed mattress of feature 18, wherein the three-dimensional (3D) sea wave appearance comprises a unique surface pattern.

Feature 20: The pet bed mattress of feature 19, wherein the unique surface pattern of the three-dimensional (3D) sea wave appearance is provided by the upper layer.

Feature 21: A method for placing a pet at comfortable rest, the method comprising the steps of: (1) obtaining a pet bed mattress including a bottom foam support base and an upper layer comprising a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a three-dimensional (3D) sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress; and (2) placing the pet upon the pet bed mattress and allowing the pet to feel the comforting and cooling airflow underneath the pet; whereby the pet rests.

Feature 22: The method of feature 21, wherein the upper layer, the zig-zagging Z-shaped air valleys or channels, and the tapering wall are formed as a single, continuous piece.

Feature 23: The method of feature 21, further comprising the step of placing a removable and washable mattress cover over the pet bed mattress.

Feature 24: The method of feature 23, wherein the mattress cover includes air-permeable fabric on the sides that allows air to flow in and out of the zig-zagging Z-shaped air valleys or channels.

Feature 25: The method of feature 21, wherein the zig-zagging Z-shaped air valleys or channels are arranged in a repeating pattern across the upper layer.

Feature 26: The method of feature 21, wherein the tapering walls are arranged in a parallel configuration, with each tapering wall separated by one of the zig-zagging Z-shaped air valleys or channels.

Feature 27: The method of feature 21, wherein the upper layer is made from a foam material comprising at least one of polyurethane foam, memory foam, gel-infused foam, latex foam, high-density foam, or an orthopedic foam.

Feature 28: The method of feature 21, wherein the three-dimensional (3D) sea wave appearance is provided by the zig-zagging Z-shape of each air channel and the tapering walls separating them.

Feature 29: The method of feature 28, wherein the three-dimensional (3D) sea wave appearance comprises a unique surface pattern.

Feature 30: The method of feature 29, wherein the unique surface pattern of the three-dimensional (3D) sea wave appearance is provided by the upper layer.

Feature 31: A pet bed mattress including a bottom foam support base and an upper layer comprising a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a three-dimensional (3D) sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress, the airflow being facilitated by the shape and arrangement of the zig-zagging Z-shaped air valleys or channels.

Feature 32: The pet bed mattress of feature 31, further comprising a mattress cover with air-permeable fabric on the sides that allows the comforting and cooling airflow underneath the pet when the mattress cover is placed over the pet bed mattress, the air-permeable fabric enabling air to flow in and out of the zig-zagging Z-shaped air valleys or channels.

Feature 33: The pet bed mattress of feature 31, wherein the upper layer comprises a compressible foam material selected from the group consisting of polyurethane foam, memory foam, gel-infused foam, orthopedic cloudy gel memory foam, latex foam, high-density foam, orthopedic foam, viscoelastic foam, open-cell foam, closed-cell foam, and combinations thereof.

Feature 34: The pet bed mattress of feature 31, wherein the zig-zagging Z-shaped air valleys or channels are shaped to provide airflow for comfort and cooling, with the shape of the air valleys or channels facilitating the flow of air underneath the pet's body.

Feature 35: The pet bed mattress of feature 32, wherein the air-permeable fabric on the sides of the mattress cover comprises at least one of a mesh material, a perforated material, a breathable synthetic fabric, a breathable natural fabric, or a moisture-wicking fabric, each of which allows air to flow through the fabric and into the zig-zagging Z-shaped air valleys or channels.

Feature 36: The pet bed mattress of feature 33, wherein the compressible material of the tapering wall is compressible by the weight of the pet's body, providing progressively greater support as the pet's body compresses the tapering wall.

Feature 37: The pet bed mattress of feature 34, wherein the shaped air channels of the zig-zagging Z-shaped air valleys or channels provide airflow for comfort and cooling to the pet, with the airflow being directed underneath the pet's body by the shape and arrangement of the air valleys or channels.

Feature 38: The pet bed mattress of feature 35, wherein the breathable material on the sides of the mattress cover allows airflow underneath the pet, facilitating the comforting and cooling airflow provided by the zig-zagging Z-shaped air valleys or channels.

Feature 39: The pet bed mattress of feature 31, wherein the bottom foam support base comprises a supportive material selected from the group consisting of high-density foam, polyurethane foam, and orthopedic foam.

Feature 40: The pet bed mattress of feature 39, wherein the supportive material of the bottom foam support base provides support and comfort to the pet bed mattress, enhancing the overall comfort and support provided by the mattress.

Feature 41: A method for placing a pet at comfortable rest, the method comprising the steps of: (1) obtaining a pet bed mattress including a bottom foam support base and an upper layer comprising a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a three-dimensional (3D) sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress, the airflow being facilitated by the shape and arrangement of the zig-zagging Z-shaped air valleys or channels; and (2) placing the pet upon the pet bed mattress and allowing the pet to feel the comforting and cooling airflow underneath the pet, the airflow being directed underneath the pet's body by the shape and arrangement of the zig-zagging Z-shaped air valleys or channels; whereby the pet rests comfortably on the mattress.

Feature 42: The method of feature 41, wherein the upper layer, the zig-zagging Z-shaped air valleys or channels, and the tapering wall are formed as a single, continuous piece using a molding process.

Feature 43: The method of feature 41, further comprising the step of placing a removable and washable mattress cover over the pet bed mattress, the mattress cover protecting the mattress from dirt, debris, and pet hair.

Feature 44: The method of feature 43, wherein the mattress cover includes air-permeable fabric on the sides that allows air to flow in and out of the zig-zagging Z-shaped air valleys or channels, facilitating the comforting and cooling airflow underneath the pet.

Feature 45: The method of feature 41, wherein the zig-zagging Z-shaped air valleys or channels are arranged in a repeating pattern across the upper layer, providing consistent airflow and support throughout the mattress.

Feature 46: The method of feature 41, wherein the tapering walls are arranged in a parallel configuration, with each tapering wall separated by one of the zig-zagging Z-shaped air valleys or channels, creating a uniform pattern of support and airflow.

Feature 47: The method of feature 41, wherein the upper layer is made from a foam material comprising at least one of polyurethane foam, memory foam, gel-infused foam, latex foam, high-density foam, orthopedic foam, orthopedic cloudy gel memory foam, viscoelastic foam, open-cell foam, closed-cell foam, or combinations thereof, each of which provides a combination of support, comfort, and durability.

Feature 48: The method of feature 41, wherein the three-dimensional (3D) sea wave appearance is provided by the zig-zagging Z-shape of each air channel and the tapering walls separating them, creating a visually appealing and unique surface pattern.

Feature 49: The method of feature 48, wherein the three-dimensional (3D) sea wave appearance comprises a unique surface pattern that mimics the look of sea waves, providing an aesthetically pleasing appearance to the pet bed mattress.

Feature 50: The method of feature 49, wherein the unique surface pattern of the three-dimensional (3D) sea wave appearance is provided by the upper layer, which is formed using a molding process to create the zig-zagging Z-shaped air valleys or channels and tapering walls.

Feature 51: A pet bed mattress assembly, comprising: an upper comfort layer comprising a plurality of zig-zagging Z-shaped air valleys or channels each separated by a tapering wall with a thinner top thickness and a thicker bottom thickness, wherein each tapering wall provides progressively greater support for a pet's body as each tapering wall is compressed by a weight of the pet's body, wherein the upper comfort layer provides a sea wave appearance due to a zig-zagging Z-shape of each zig-zagging Z-shaped air channel along with each separated by the tapering wall, and wherein each of the zig-zagging Z-shaped air valleys or channels provides a comforting and cooling airflow underneath the pet when the pet's body is lying on the upper comfort layer.

Feature 52: The pet bed mattress assembly of feature 51, further comprising: a bottom support layer; and a mattress cover, wherein the pet bed mattress assembly includes the bottom support layer and is provided with the mattress cover.

Feature 53: The pet bed mattress assembly of feature 52, wherein the mattress cover comprises a mattress cover assembly that is placed over the pet bed mattress assembly and includes an air-permeable fabric on sides of the mattress cover, wherein the air-permeable fabric allows the comforting and cooling airflow underneath the pet when the mattress cover is placed over the pet bed mattress assembly.

Feature 54: The pet bed mattress assembly of feature 52, wherein the bottom support layer and/or the mattress cover comprises a non-slip bottom layer operative to keep the pet bed mattress assembly from slipping on a floor when a pet moves onto the pet bed mattress assembly.

Feature 55: The pet bed of feature 51, wherein a three-dimensional (3D) wave-pattern is provided by a plurality of Z-shaped ventilation slots from the zig-zagging Z-shaped air valleys.

In yet other embodiments, a method of making a pet bed mattress assembly is provided comprising a composition discussed in any of the features above and optionally adding the mattress cover (during use). As will be discussed in more detail below, the technology disclosed herein is surprisingly pleasing to pets, is surprisingly durable and solves many of the larger problems introduced above.

Other implementations are also described and recited herein. These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Solely for the purpose of illustration, certain embodiments of the present invention are explained using examples in the drawings described below. It should be understood, however, that the invention is not limited to the precise arrangements, dimensions, and configurations shown. In the figures:

FIG. 6A illustrates, in a flowchart, the structure and function of a pet bed mattress with cooling airflow.

FIG. 6B (left), FIG. 6C (center), and FIG. 6D (right) all illustrate, in a flowchart, the components and features of the pet bed mattress for comfort and airflow.

Figure 1A:
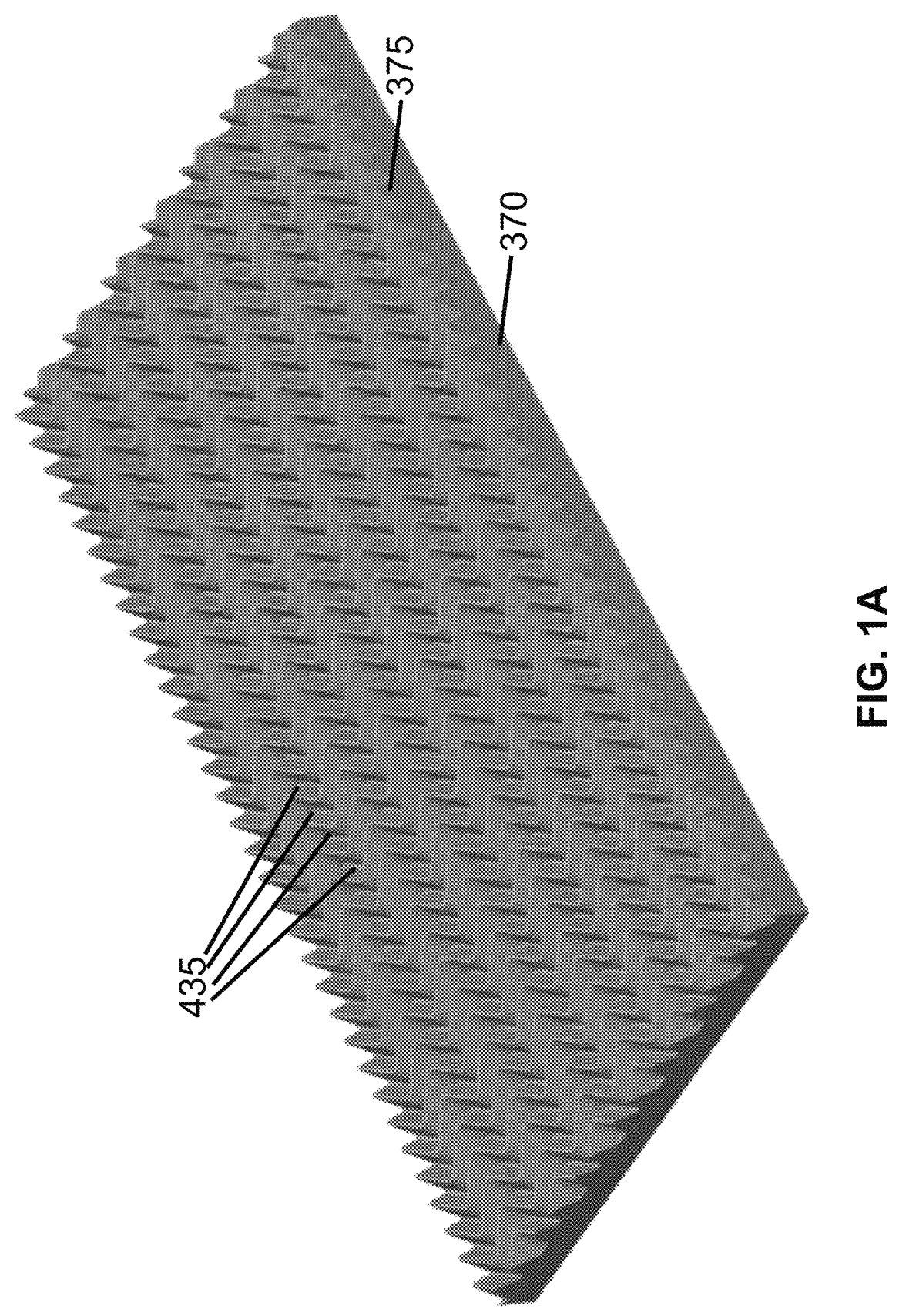
FIG. 1A shows a perspective view of how the 3D wave-pattern creates a Z-shaped vent 435 for air flow when a pet's body is in contact with a surface of the pet bed or mat so that the air can always flow smoothly.

All trademarks mentioned herein are used in fair use. It should be understood that while different numbers/numbering are/is sometimes used in some of the figures above to describe different embodiments and different aspects of the technology, any number from any figure can be inter-combined with a numbered aspect from any other figures. All trademarks, images, likenesses, words, and depictions in the drawings and the disclosure are plainly in fair use and are provided solely for the purposes of illustration of the invention in view of an urgent need to treat subjects as further discussed in detail below.

DETAILED DESCRIPTION OF THE INVENTION

The subject innovation is now described in some instances, when necessary, with reference to the drawings. In the following description, for purposes of explanation, numerous specific details are set forth in order to provide a thorough understanding of the present invention. It may be evident, however, that the present invention may be practiced without these specific details. In other instances, well-known structures, methods, and devices are shown in block diagram form or with illustrations in order to facilitate describing the present invention. It is to be appreciated that certain aspects, modes, embodiments, variations and features of the invention are described below in various levels of detail in order to provide a substantial understanding of the present invention.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs. If there is an apparent discrepancy between the usage of a term in the art and its definition provided herein, the definition provided within the specification shall prevail. In general, typical chemical terminology is found in the International Union of Pure and Applied Chemistry GoldBook[1]. This disclosure is purposefully presented in commonly understood words, known to a person of skill in the art, but Merriam-Webster's Online Dictionary is used, when appropriate, for terms not specifically demonstrated herein or not known in the art[2].

As used in this specification and the appended claims, the singular forms "a," "an" and "the" include plural referents unless the content clearly dictates otherwise. For example, reference to "a cell" includes a combination of two or more cells, and the like.

As used herein, the term "approximately" or "about" in reference to a value or parameter are generally taken to include numbers that fall within a range of 5%, 10%, 15%, or 20% in either direction (greater than or less than) of the number unless otherwise stated or otherwise evident from the context (except where such number would be less than 0% or exceed 100% of a possible value). As used herein, reference to "approximately" or "about" a value or parameter includes (and describes) embodiments that are directed to that value or parameter. For example, description referring to "about X" includes description of "X".

As used herein, the term "or" means "and/or." The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "comprising" means that other elements can also be present in addition to the defined elements presented. The use of "comprising" indicates inclusion rather than limitation. The term "including" can be interchanged with "comprising".

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of additional elements that do not materially affect the basic and novel or functional characteristic(s) of that embodiment of the invention. The term "consisting essentially of" can also be exemplified by plain language provided in the claims.

The term "statistically significant" or "significantly" refers to statistical significance and generally means a two-standard deviation (2SD) or greater difference.

As used herein, a small molecule is less than 1000 MW and a large molecule is not less than 1000 MW including biologics, oligonucleotides, peptides, oligosaccharides, and larger molecules.

As discussed above, unless otherwise defined herein, scientific and technical terms used in connection with the present application shall have the meanings that are commonly understood by those of ordinary skill in the art to which this disclosure belongs. It should be understood that this invention is not limited to the particular methodology, protocols, devices, implants, and reagents, etc., described herein and as such can vary. The terminology used herein is for the purpose of describing particular embodiments only and is not intended to limit the scope of the present invention, which is defined solely by the claims. If the references discussed above are not sufficient in the English language used herein, definitions of common terms in immunology and molecular biology can be found in The Merck Manual of Diagnosis and Therapy;[3] The Encyclopedia of Molecular Cell Biology and Molecular Medicine;[4] Molecular Biology and Biotechnology: a Comprehensive Desk Reference;[5] Immunology;[6] Janeway's Immunobiology;[7] Lewin's Genes XI;[8] Molecular Cloning: A Laboratory Manual.;[9] Basic Methods in Molecular Biology;[10] Laboratory Methods in Enzymology;[11] Current Protocols in Molecular Biology (CPMB)[12]; Current Protocols in Protein Science (CPPS);[13] and Current Protocols in Immunology (CPI)[14].

As used herein, the technology can be applied to any subject, while the technology is discussed for particularly surprising methods that have been found to put pets into relaxation. In the embodiments discussed and in any of the aspects, the disclosure described herein does not concern a process for curing a medical condition of a pet.

Other terms are defined herein within the description of the various aspects of the invention. It is clearly contemplated herein that the technology can be used in cleaning applications far outside the scope of the examples discussed herein.

3D Sea Wave Shape Polyurethane Foam for Use in Pet Bed/Cushion

It is to be understood that the specific devices and processes illustrated in the attached drawings and described in the specification are exemplary embodiments of the inventive concepts defined in the appended claims. Hence, specific dimensions and other physical characteristics relating to the embodiments disclosed herein are not to be considered as limiting, unless the claims expressly state otherwise.

The present invention solves the problem of pets sleeping on a pet bed or mat for a long time. More specifically, the present invention's three-dimensional (3D) wave pattern design makes the pet body and the pet bed or mat surface in contact with a Z-shaped ventilation slot. With such a design, air can always flow smoothly, and a sponge material itself is soft and supportive.

It should be noted that the present invention makes no medical claims and does not cure pain or other aliments in pets.

The present invention is directed towards a 3D sea wave foam that can be used as a filling material of a pet bed and/or pet cushion. As seen in FIGS. 1-6, this 3D wave-patterned sponge creates a Z-shaped vent for air flow when a pet's body is in contact with a surface of the pet bed or mat so that the air can always flow smoothly. The sponge material itself is soft and supportive.

As seen in the figures, the three-dimensional (3D) wave-patterned sponge is preferably a 3D Sea Wave Shape Polyurethane Foam Pad. The 3D Sea Wave Shape Polyurethane Foam of the present invention consists of one side having 3D wave-patterned structures. These 3D wave-patterned structures provide a Z-shaped vent for air flow when a pet's body is in contact with a surface of the pet bed or mat so that the air can always flow smoothly.

In some embodiments, the three-dimensional (3D) wave-patterned sponge is made from orthopedic foam or from orthopedic cloudy gel memory foam.

Figure 1B:
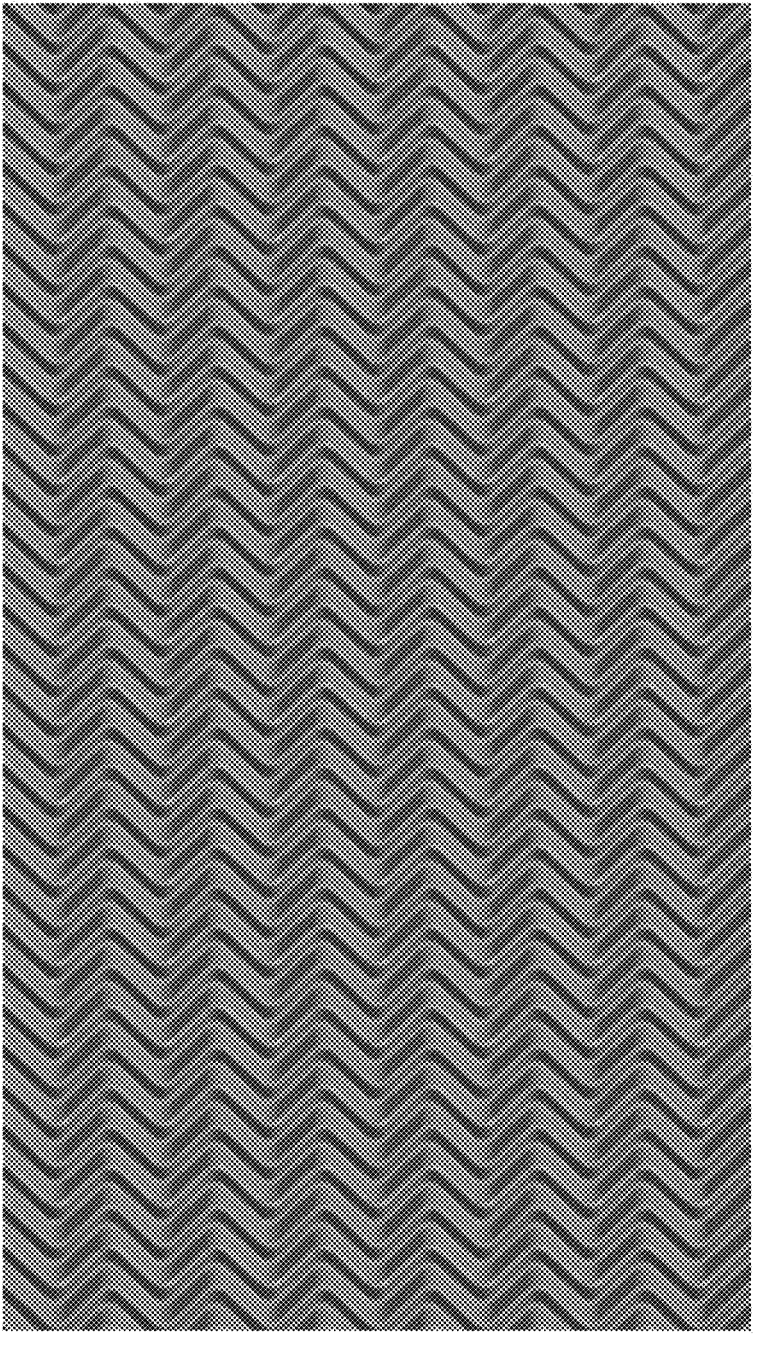
FIG. 1B illustrates how the upper layer provides a three-dimensional (3D) sea wave appearance due to a zig-zagging Z-shape of each zig-zagging Z-shaped air channel along with each separated by the tapering wall.

Introducing the technology in a practical application, FIG. 1A shows a perspective view of a pet bed mattress including a bottom foam support base 370 and an upper layer 375 comprising a plurality of zig-zagging Z-shaped air valleys 435 or channels each separated by a tapering wall with a thinner top thickness and a thicker bottom thickness so that each tapering wall provides progressively greater support for a pet's body as each tapering wall is compressed by the weight of the pet's body. As seen in FIG. 1B, the upper layer provides a three-dimensional (3D) sea wave appearance due to a zig-zagging Z-shape of each of the zig-zagging Z-shaped air channel along with each separated by the tapering wall.

Figures 1C, 1D:
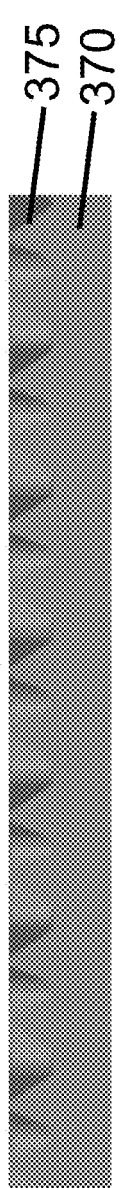
FIG. 1C shows a left side view with the upper layer 375 and the bottom foam support base 370.
FIG. 1D shows a front side view with the upper layer 375 and the bottom foam support base 370.
Figures 1E, 1F:
FIG. 1E shows a right-side view with the upper layer 375 and the bottom foam support base 370.
FIG. 1F shows a back side view with the upper layer 375 and the bottom foam support base 370.
Figure 1G:
FIG. 1G (bottom view) shows the solid bottom foam support base 370.

FIG. 1C shows a left side view with the upper layer 375 and the bottom foam support base 370. FIG. 1D shows a front side view with the upper layer 375 and the bottom foam support base 370. FIG. 1E shows a right-side view with the upper layer 375 and the bottom foam support base 370; and FIG. 1F shows a back side view with the upper layer 375 and the bottom foam support base 370. The bottom view in FIG. 1G shows the solid bottom foam support base 370.

Figure 1H:
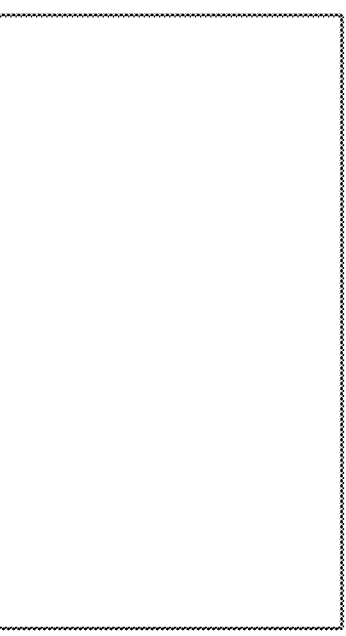
FIG. 1H and FIG. 1I show schematic views illustrating that the X, Y, and Z dimensions can be any size suitable for various sized pets.
Figure 1H:
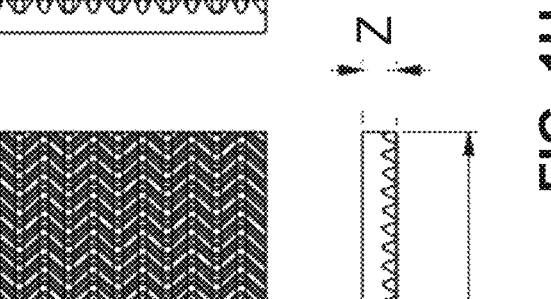
Figure 1H:
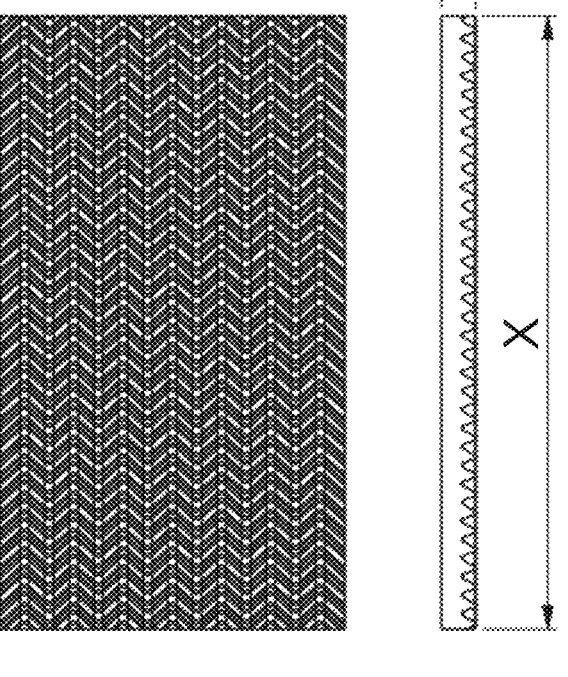
Figure 1H:
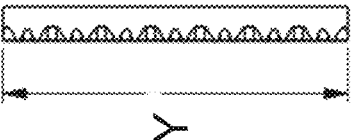
Figure 1I:
Figure 1I:
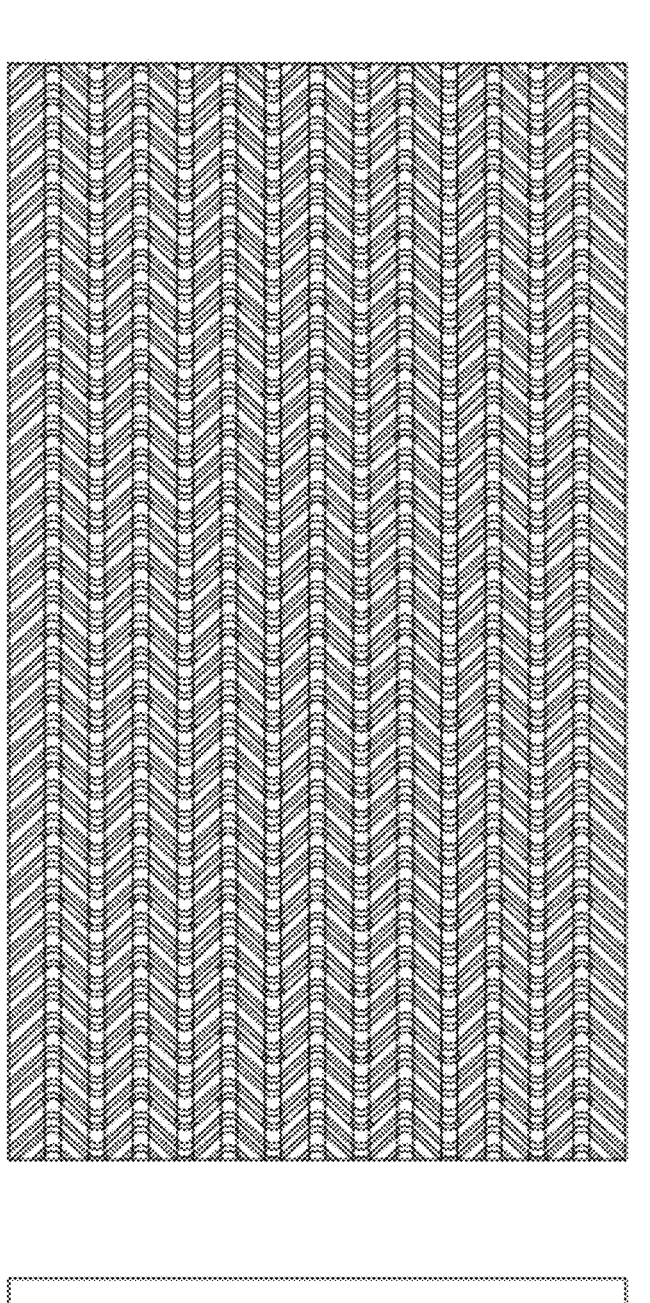
Figure 1I:
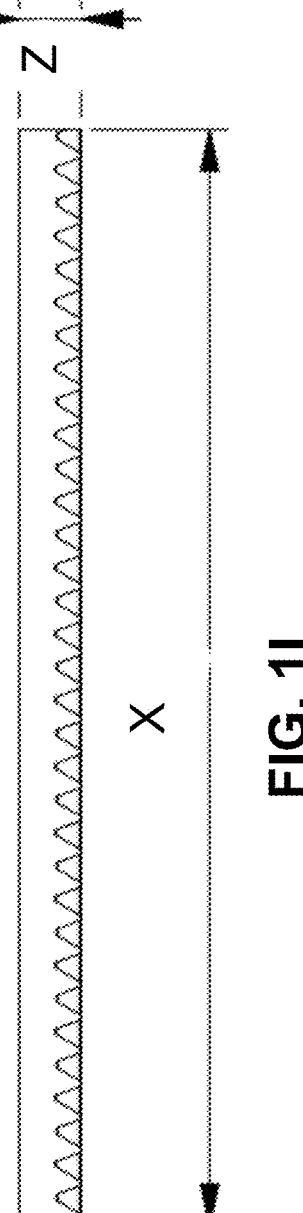
Figure 1I:
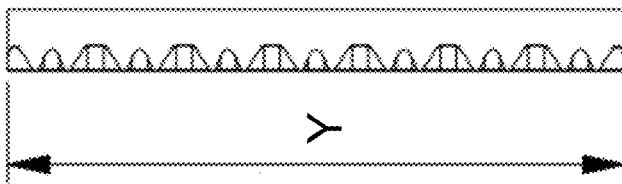

FIG. 1H and FIG. 1I show schematic views illustrating that the X, Y, and Z dimensions can be any size suitable for various sized pets.

In general examples, the bottom foam support base 370 can be in the range from about 0.5 cm to about 50 cm, or in the range from about 0.5 cm to about 15 cm, optionally about 0.5 cm to about 5 cm, or about 0.5 cm to about 2 cm. The upper layer 375 can be in the range from about 1 cm to about 50 cm, or in the range from about 1 cm to about 15 cm, optionally in the range from about 1 cm to about 10 cm, or about 1 cm to about 5 cm. These example ranges can be expanded, it is contemplated, for example when applied to large animals.

Figure 2A:
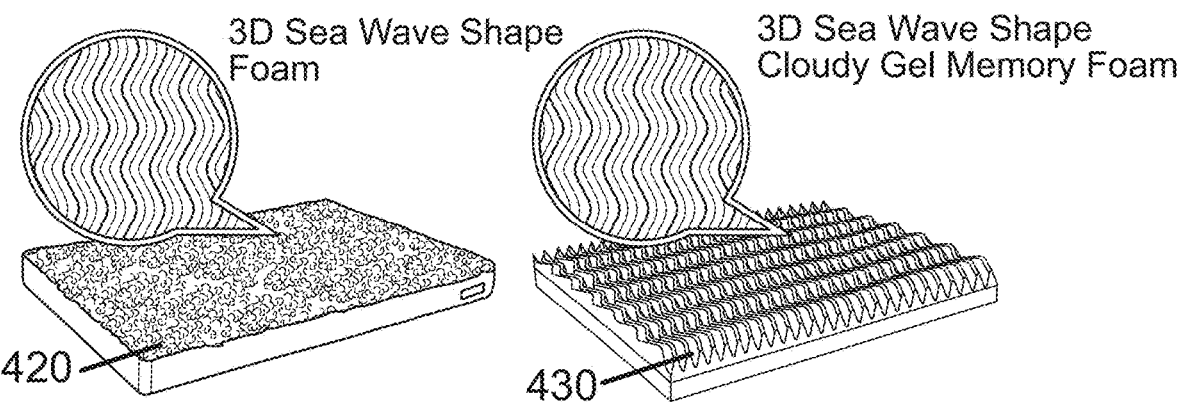
FIG. 2A shows construction using an orthopedic foam 420 or an orthopedic cloudy gel memory foam 430.
Figure 2A:
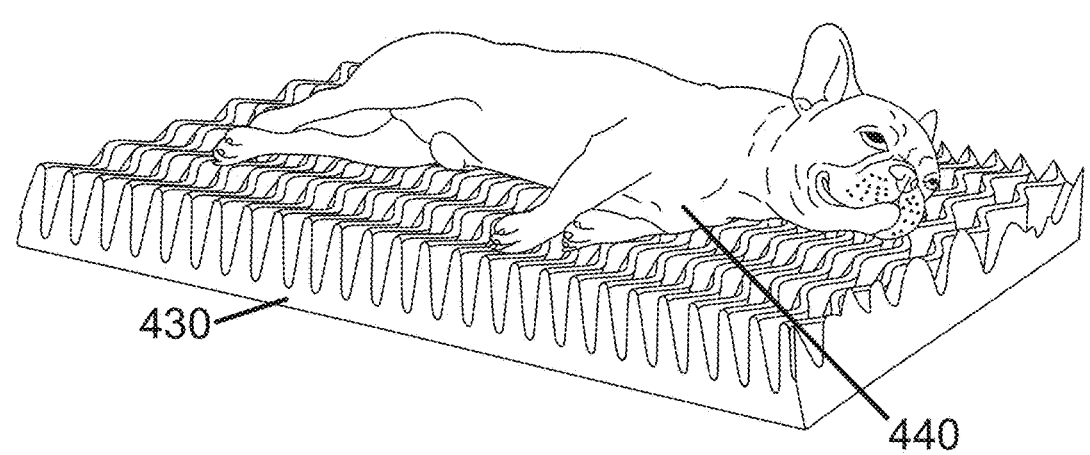

FIG. 2A shows construction using an orthopedic foam 420 or an orthopedic cloudy gel memory foam 430. The medium dog 440 immediately relaxes on the present technology.

Figure 2B:
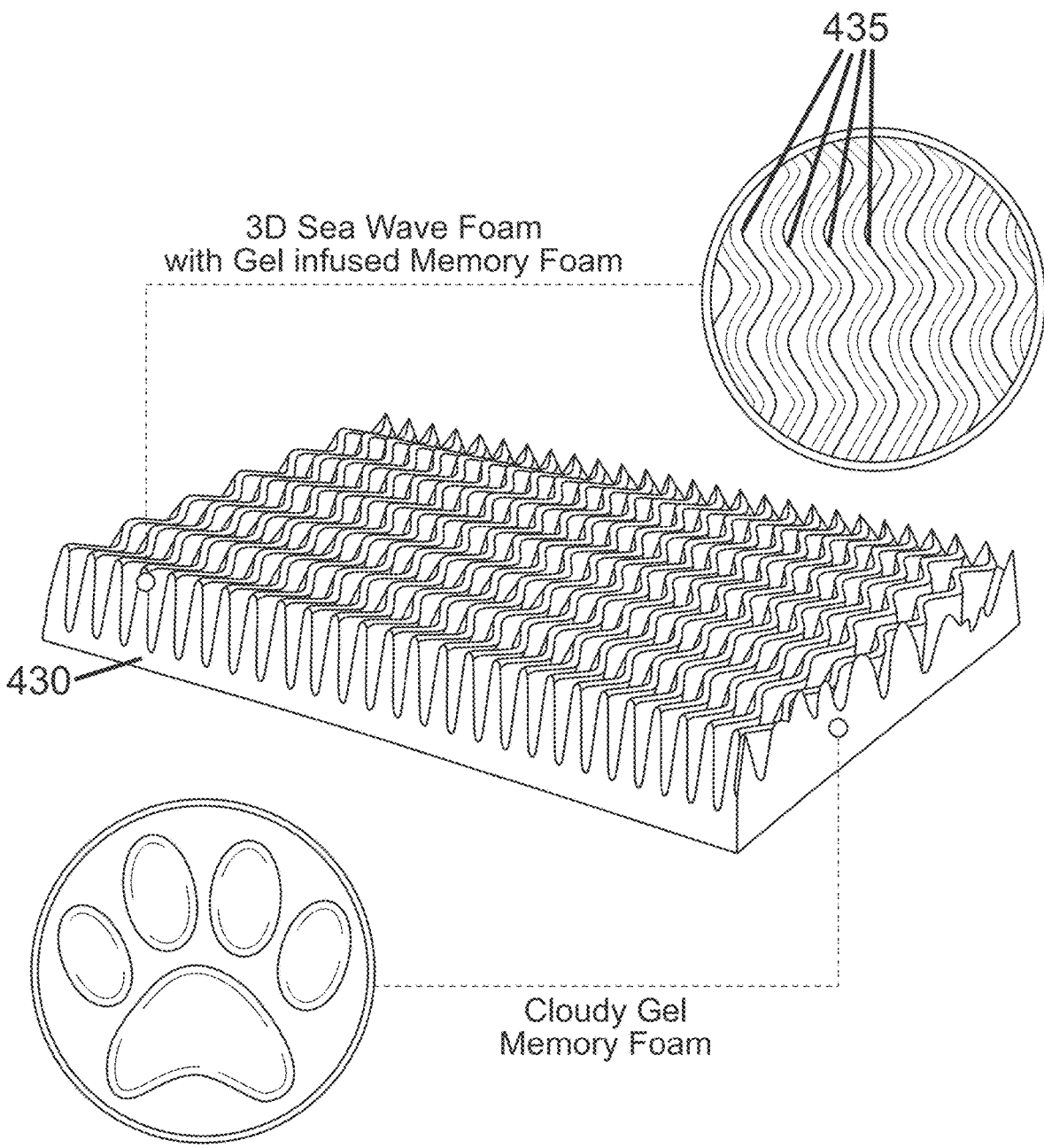
FIG. 2B shows a closer view of the plurality of zig-zagging Z-shaped air valleys 435.

FIG. 2B shows a closer view of the plurality of zig-zagging Z-shaped air valleys 435.

Figure 2C:
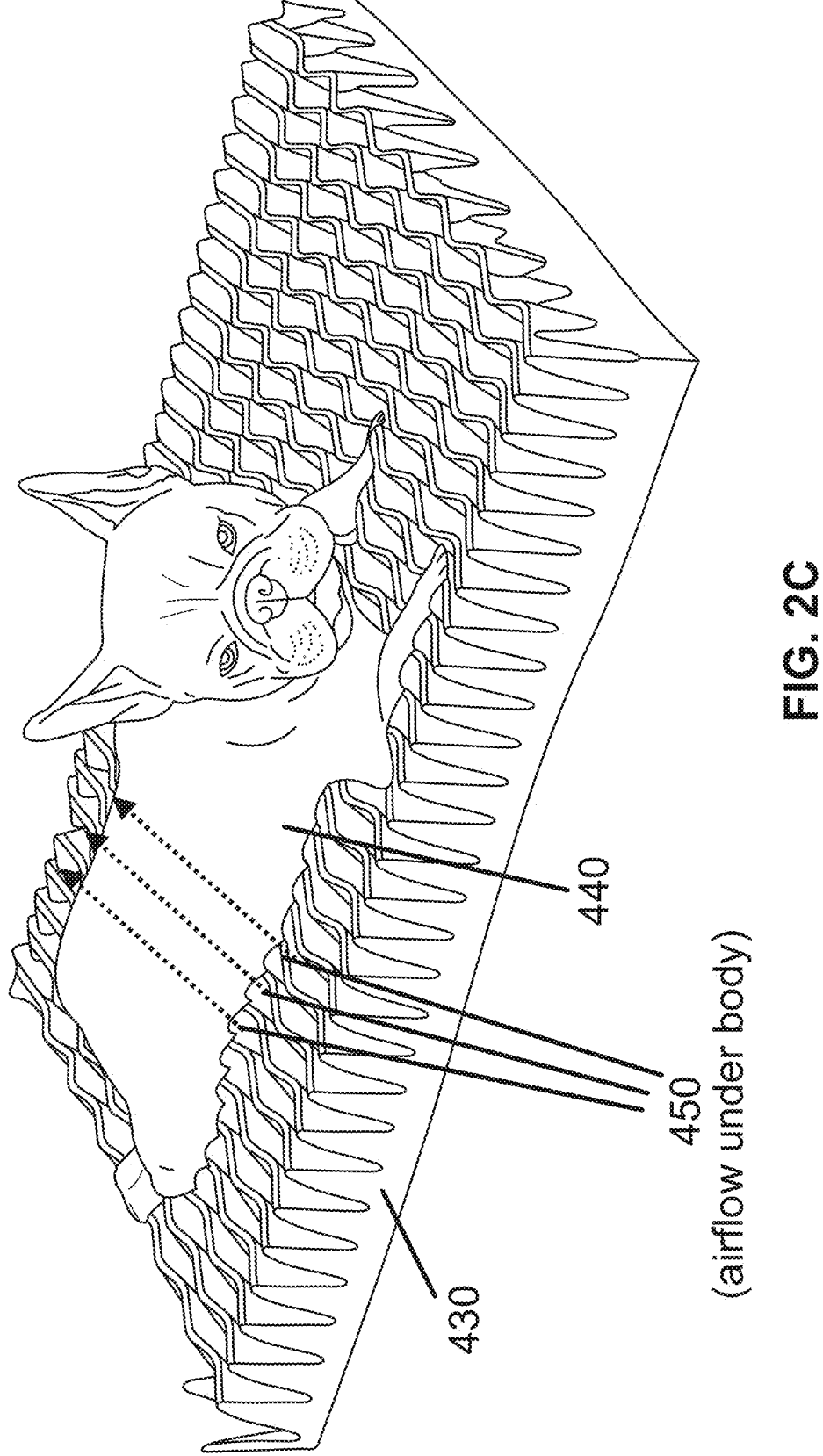
FIG. 2C shows how the medium dog 440 is upon the orthopedic cloudy gel memory foam 430 and the airflow under body 450 is maintained even while the medium dog 440 is compressing the pet bed mattress.
Figure 2D:
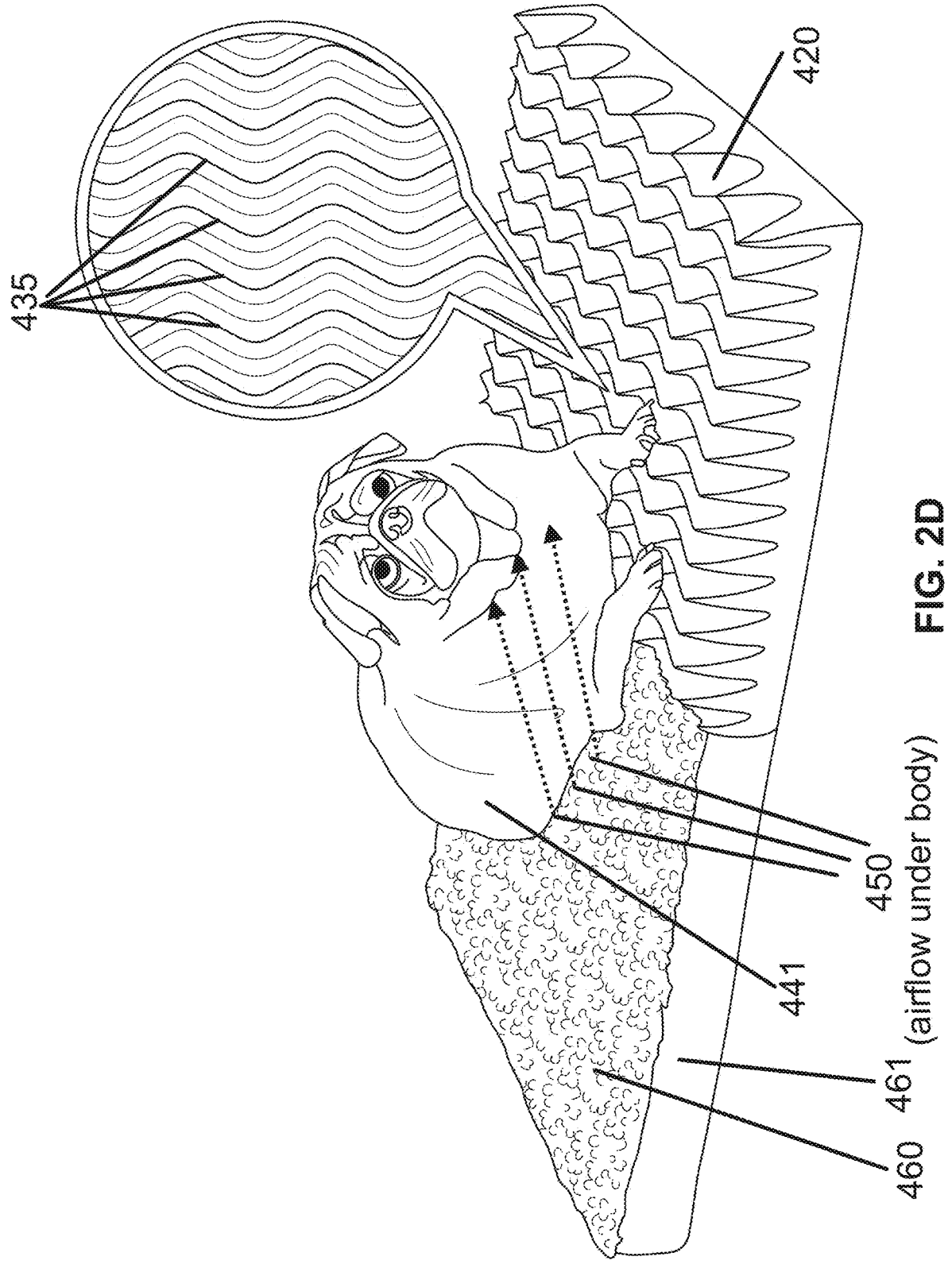
FIG. 2D shows a fabric surface 460 with a breathable fabric side 461 (at left) maintains an airflow under body 450 even for a larger dog 441.

FIG. 2C shows how the medium dog 440 is upon the orthopedic cloudy gel memory foam 430 and the airflow under body 450 is maintained even while the medium dog 440 is compressing the pet bed mattress. FIG. 2D shows a fabric surface 460 with a breathable fabric side 461 (at left) maintains an airflow under body 450 even for a larger dog 441. The orthopedic foam 420 includes the upper layer 375 which has the plurality of zig-zagging Z-shaped air valleys 435.

Figure 3A:
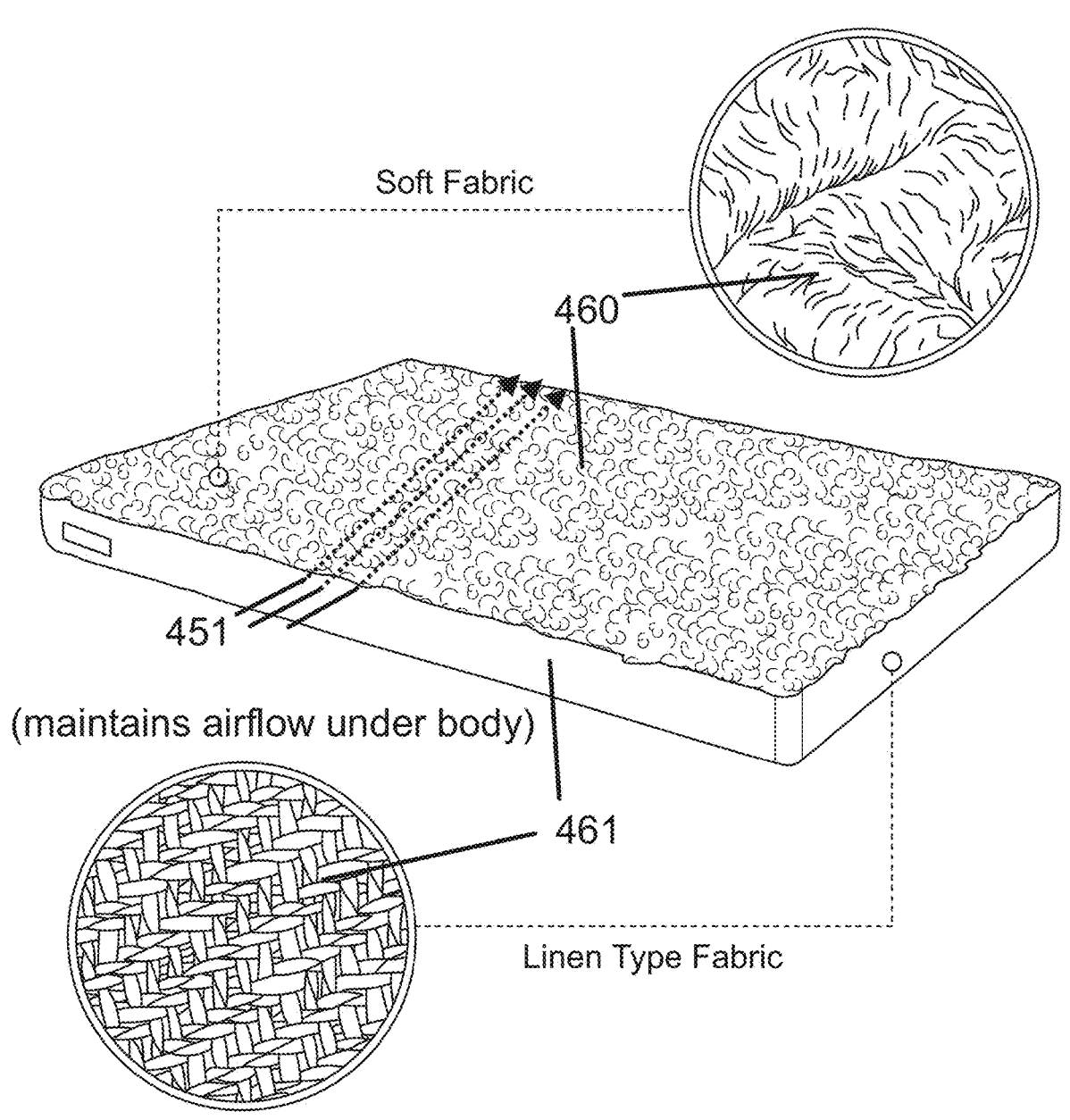
FIG. 3A illustrates how the breathable fabric side 461 on the sides of the pet bed mattress maintains an airflow under body 451 even with the full mattress cover on the pet bed mattress.

FIG. 3A illustrates how the breathable fabric side 461 on the sides of the pet bed mattress maintains an airflow under body 451 even with the full mattress cover on the pet bed mattress.

Figure 3B:
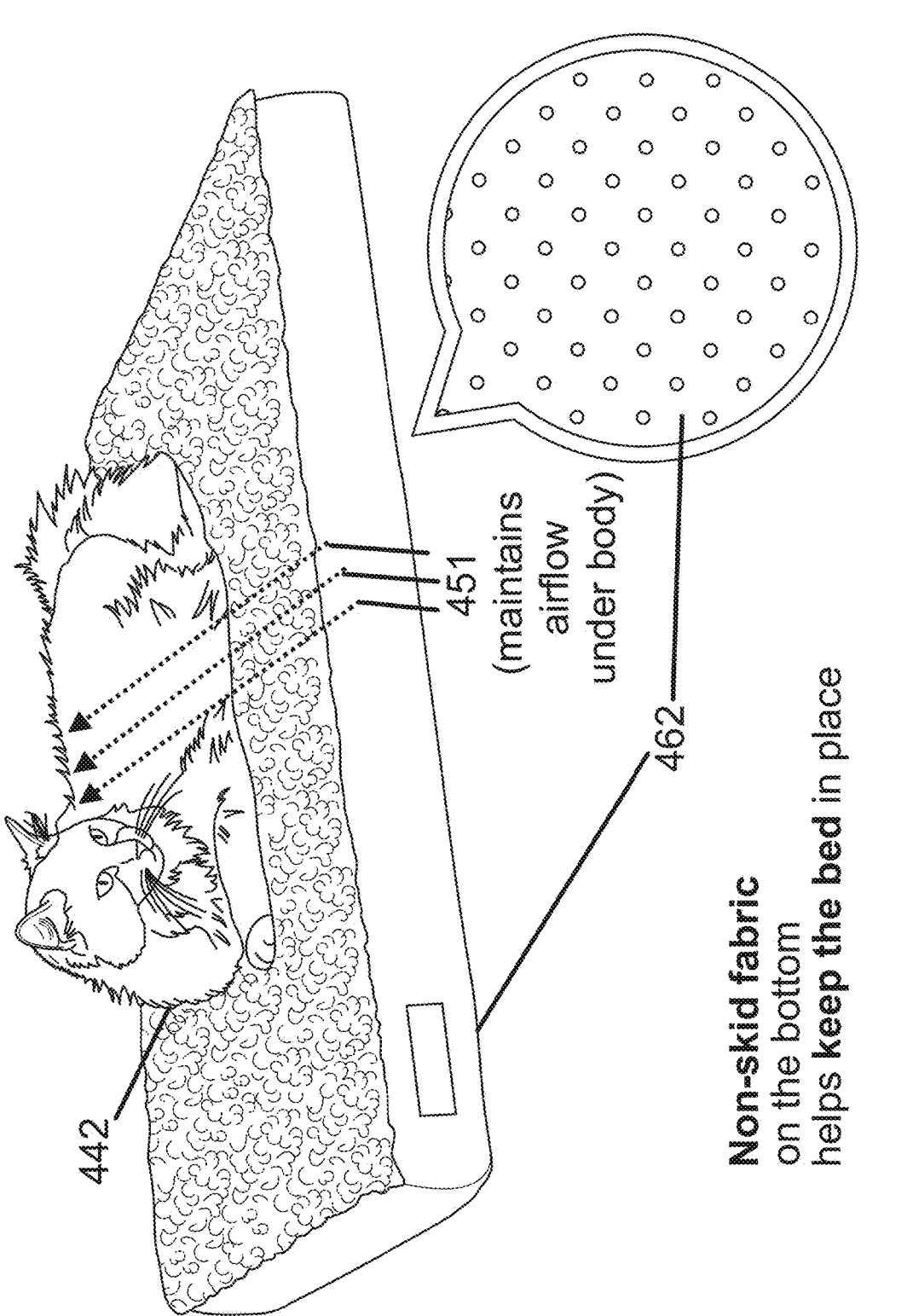
FIG. 3B shows a long-furred pet 442 is upon the covered mattress and airflow under body 451 is maintained, while a non-skid surface 462 is disposed under the pet bed mattress.

In FIG. 3B, a long-furred pet 442 is upon the covered mattress and airflow under body 451 is maintained, while a non-skid surface 462 is disposed under the pet bed mattress.

Figure 3C:
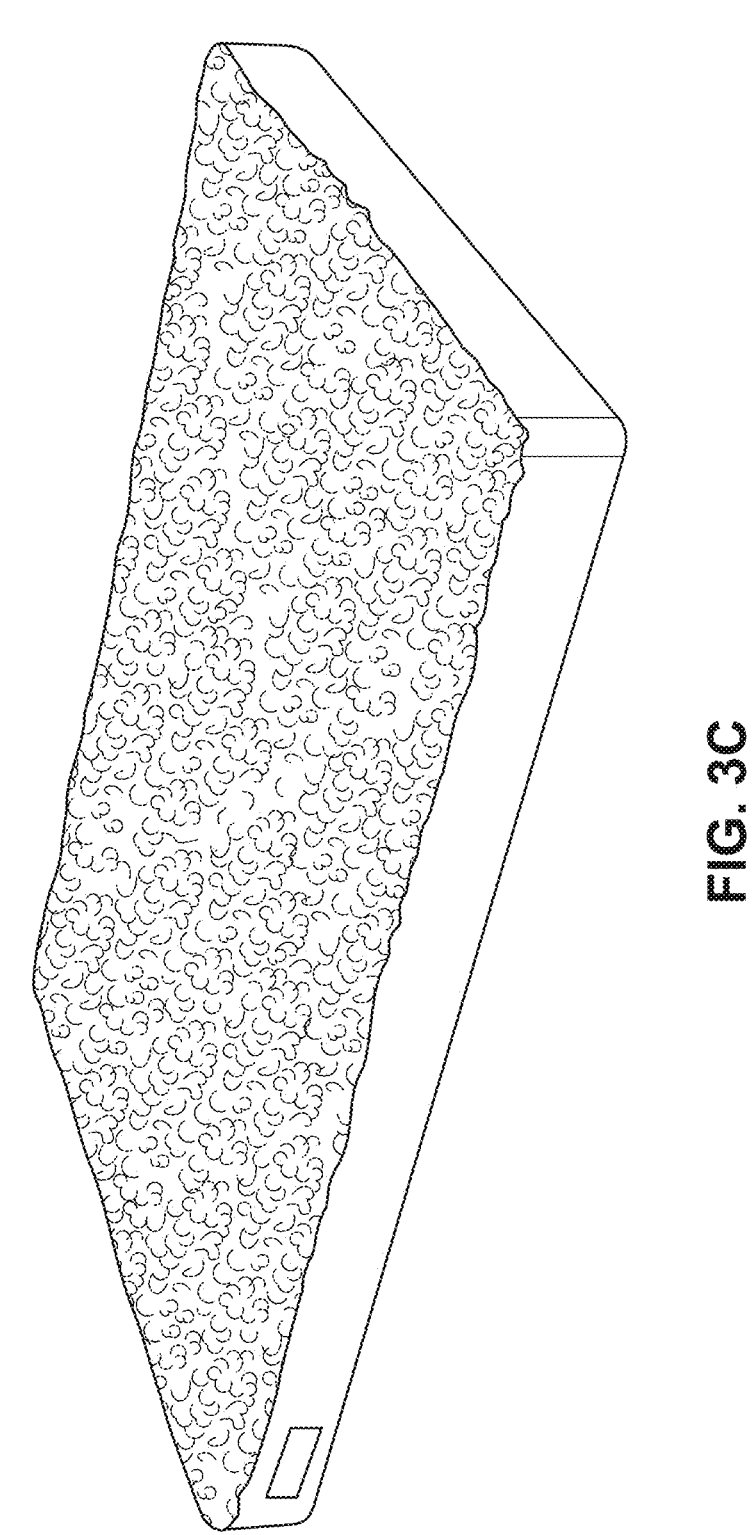
FIG. 3C provides a photo of the covered pet bed mattress.

FIG. 3C provides a photo of the covered pet bed mattress.

Figure 3D:
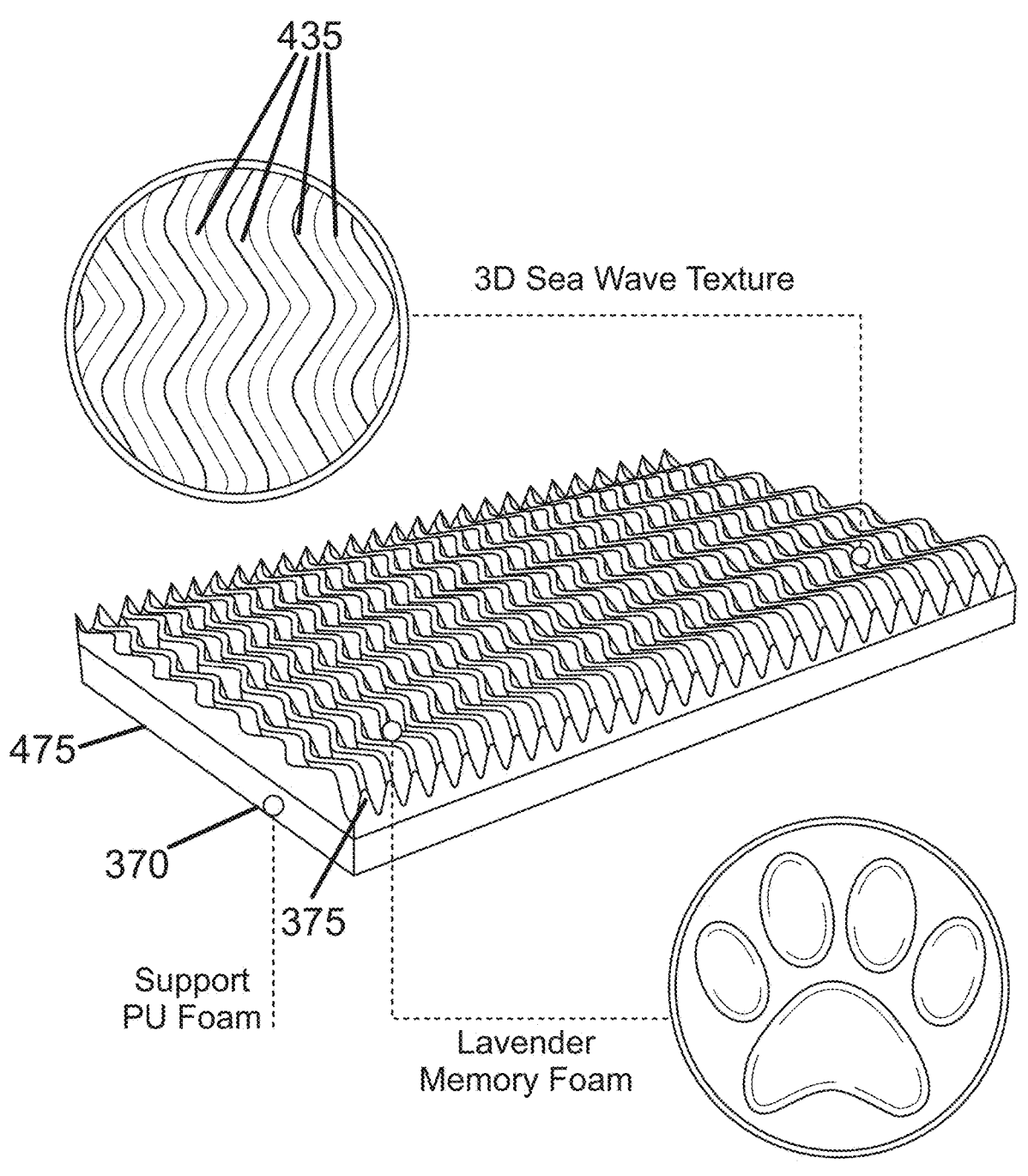
FIG. 3D shows a photo of a PU (polyurethane) bottom foam support base 370 and an upper layer 375 with lavender color.
Figure 4A:
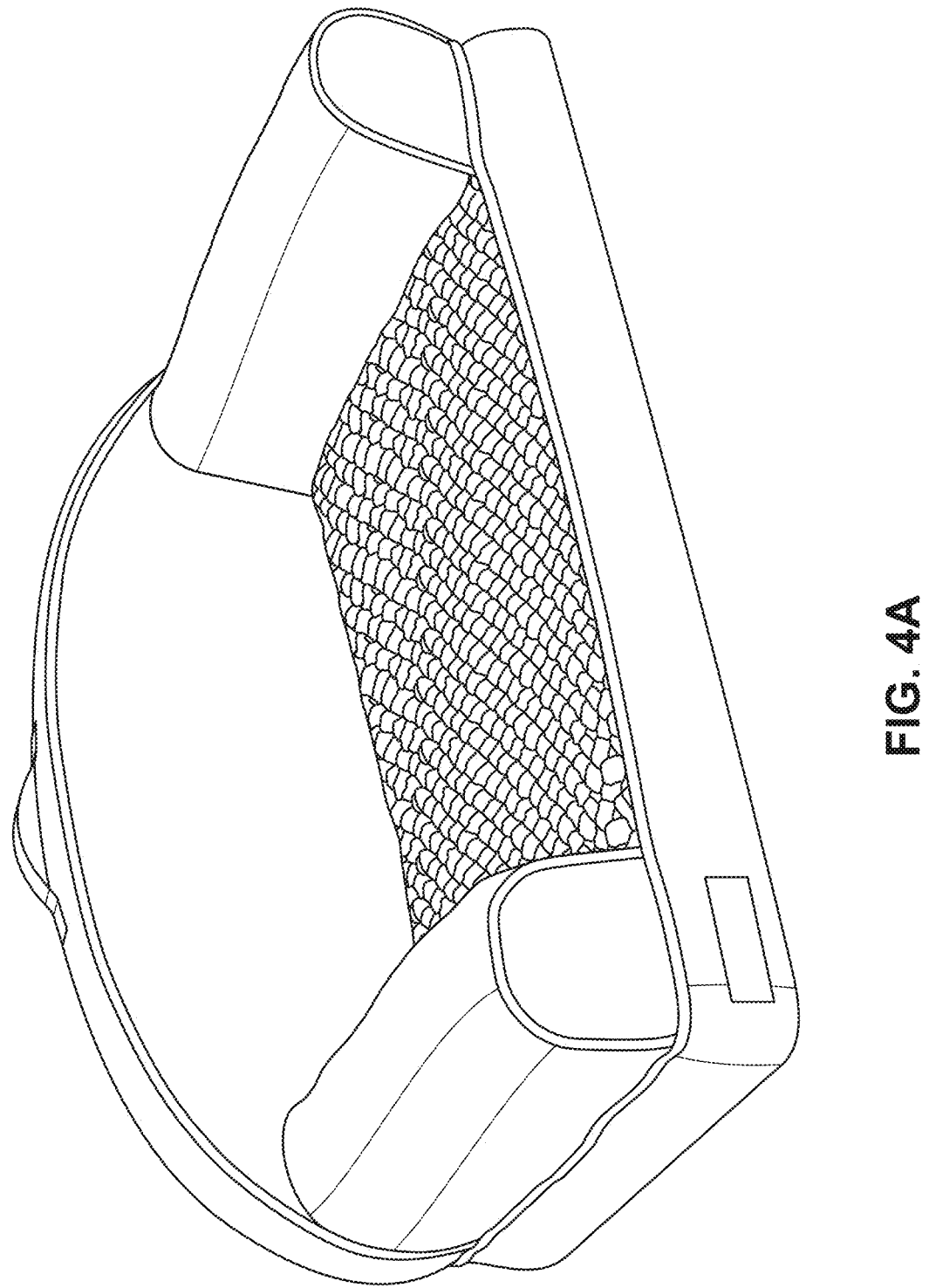
FIG. 4A shows an example of a full bed including the technology disclosed herein.
Figure 4B:
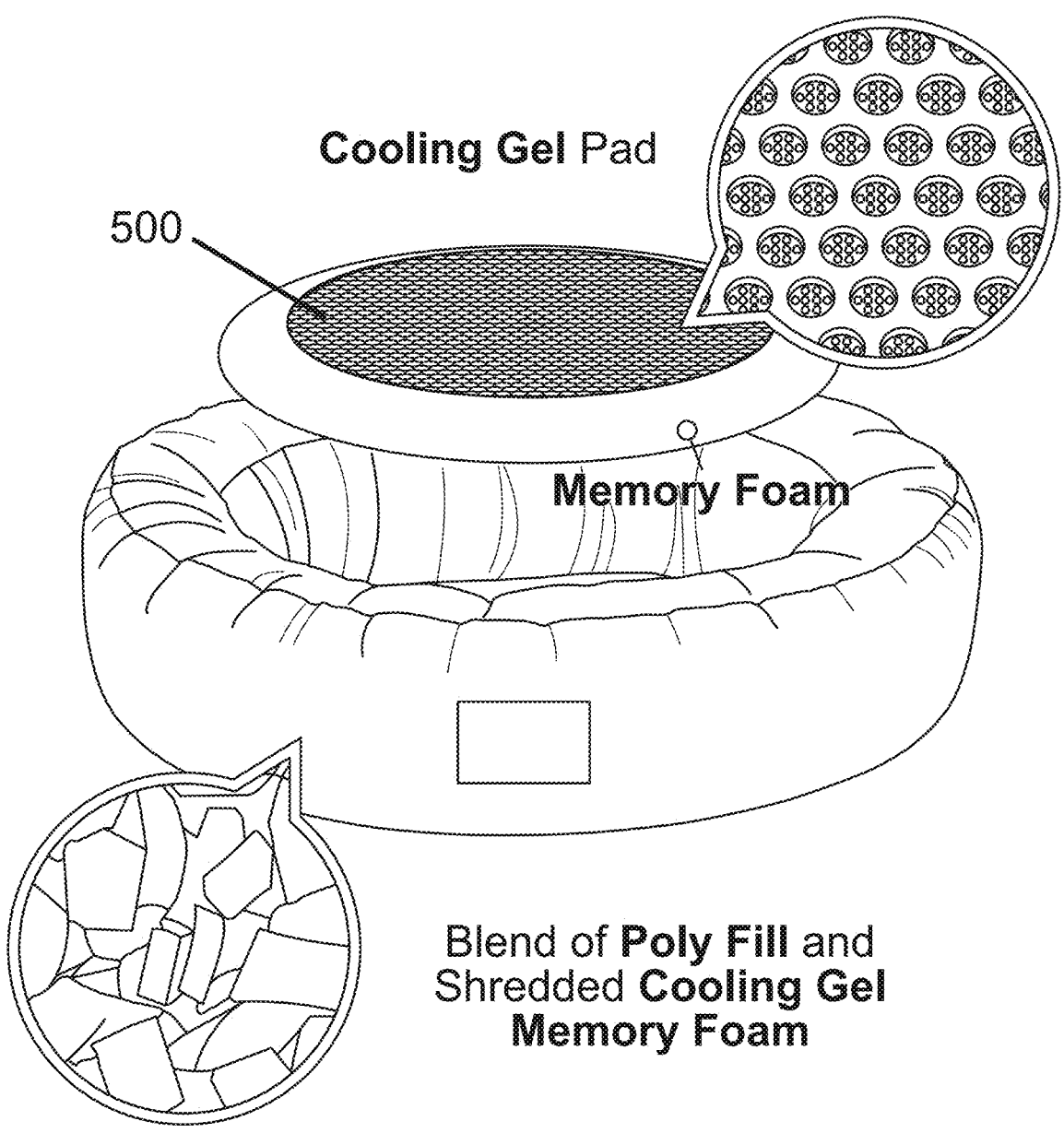
FIG. 4B shows an optional cooling gel pad 500 that can be placed under the pet bed mattresses disclosed herein.
Figure 4C:
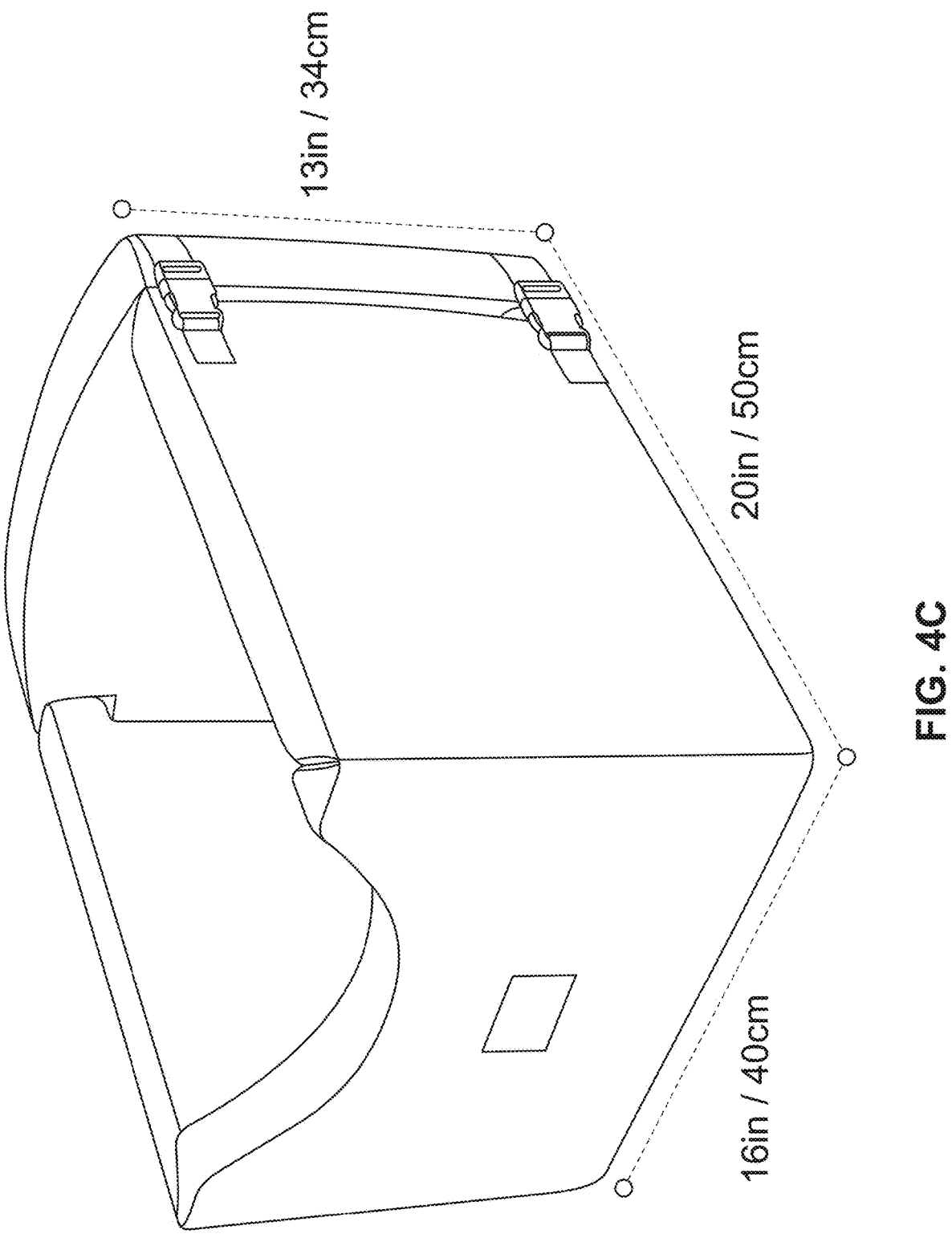
FIG. 4C shows an example of a car carrier seat that includes the pet bed mattress (at bottom) disclosed herein.
Figure 4D:
FIG. 4D shows the car carrier seat in use.

FIG. 3D shows a photo of a PU (polyurethane) bottom foam support base 370 and a upper layer 375 with lavender color. FIG. 4A shows an example of a full bed including the technology disclosed herein. FIG. 4B shows an optional cooling gel pad 500 that can be placed under the pet bed mattresses disclosed herein. FIG. 4C shows an example of a car carrier seat that includes the pet bed mattress (at bottom) disclosed herein. FIG. 4D shows the car carrier seat in use.

Figure 5:
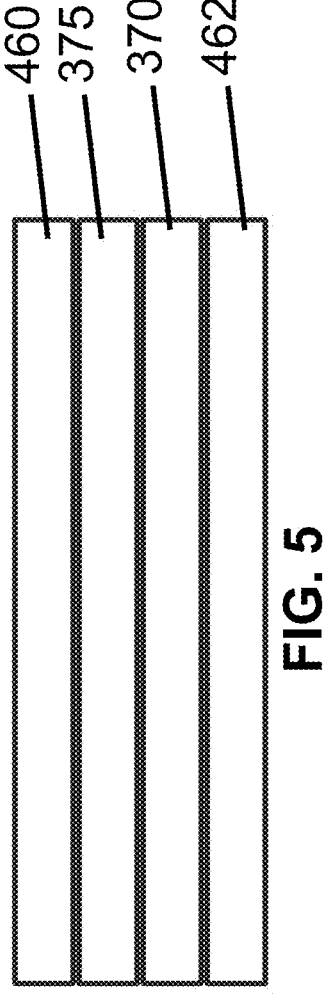
FIG. 5 shows a cut-away (layered) example of a non-skid surface 462 under the bottom foam support base 370 which is under the upper layer 375, and at top is the fabric surface 460.

FIG. 5 shows a cut-away (layered) example of a non-skid surface 462 under the bottom foam support base 370 which is under the upper layer 375, and at top is the fabric surface 460.

FIG. 6A illustrates, in a flowchart, the structure and function of a pet bed mattress with cooling airflow. FIG. 6B (left), FIG. 6C (center), and FIG. 6D (right) all illustrate, in a flowchart, the components and features of the pet bed mattress for comfort and airflow.

Pets shown the technology (in any environment) immediately recline and sleep upon it. In some embodiments, the techniques described herein relate to a pet bed mattress including a bottom foam support base and an upper layer including a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a three-dimensional (3D) sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress.

According to some aspects, the techniques described herein relate to a pet bed mattress, further including a mattress cover with air-permeable fabric on the sides that allows the comforting and cooling airflow underneath the pet when the mattress cover is placed over the pet bed mattress.

In some embodiments, the techniques described herein relate to a pet bed mattress, wherein the upper layer includes a compressible foam material.

According to some aspects, the techniques described herein relate to a pet bed mattress, wherein the zig-zagging Z-shaped air valleys or channels are shaped to provide airflow for comfort and cooling.

In some embodiments, the techniques described herein relate to a pet bed mattress, wherein the air-permeable fabric on the sides of the mattress cover includes at least one of a mesh material, a perforated material, a breathable synthetic fabric, a breathable natural fabric, or a moisture-wicking fabric.

According to some aspects, the techniques described herein relate to a pet bed mattress, wherein the compressible material of the tapering wall is compressible by the weight of the pet's body.

In some embodiments, the techniques described herein relate to a pet bed mattress, wherein the shaped air channels of the zig-zagging Z-shaped air valleys or channels provide airflow for comfort and cooling to the pet.

According to some aspects, the techniques described herein relate to a pet bed mattress, wherein the breathable material on the sides of the mattress cover allows airflow underneath the pet.

In some embodiments, the techniques described herein relate to a pet bed mattress, wherein the bottom foam support base includes a supportive material.

According to some aspects, the techniques described herein relate to a pet bed mattress, wherein the supportive material of the bottom foam support base provides support and comfort to the pet bed mattress.

In some embodiments, the techniques described herein relate to a pet bed mattress, wherein the varying thickness of the tapering wall is compressible by the weight of the pet's body to provide progressively greater support.

According to some aspects, the techniques described herein relate to a pet bed mattress, wherein the upper layer, the zig-zagging Z-shaped air valleys or channels, and the tapering wall are formed as a single, continuous piece.

In some embodiments, the techniques described herein relate to a pet bed mattress, wherein the mattress cover is removable and washable.

According to some aspects, the techniques described herein relate to a pet bed mattress, wherein the air-permeable fabric on the sides of the mattress cover allows air to flow in and out of the zig-zagging Z-shaped air valleys or channels.

In some embodiments, the techniques described herein relate to a pet bed mattress, wherein the zig-zagging Z-shaped air valleys or channels are arranged in a repeating pattern across the upper layer.

According to some aspects, the techniques described herein relate to a pet bed mattress, wherein the tapering walls are arranged in a parallel configuration, with each tapering wall separated by one of the zig-zagging Z-shaped air valleys or channels.

In some embodiments, the techniques described herein relate to a pet bed mattress, wherein the upper layer is made from a foam material including at least one of polyurethane foam, memory foam, gel-infused foam, latex foam, orthopedic cloudy gel memory foam, high-density foam, or an orthopedic foam.

According to some aspects, the techniques described herein relate to a pet bed mattress, wherein the three-dimensional (3D) sea wave appearance is provided by the zig-zagging Z-shape of each air channel and the tapering walls separating them.

In some embodiments, the techniques described herein relate to a pet bed mattress, wherein the three-dimensional (3D) sea wave appearance includes a unique surface pattern.

According to some aspects, the techniques described herein relate to a pet bed mattress, wherein the unique surface pattern of the three-dimensional (3D) sea wave appearance is provided by the upper layer.

In some embodiments, the techniques described herein relate to a method for placing a pet at comfortable rest, the method including the steps of: (1) obtaining a pet bed mattress including a bottom foam support base and an upper layer including a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a three-dimensional (3D) sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress; and (2) placing the pet upon the pet bed mattress and allowing the pet to feel the comforting and cooling airflow underneath the pet; whereby the pet rests.

According to some aspects, the techniques described herein relate to a method, wherein the upper layer, the zig-zagging Z-shaped air valleys or channels, and the tapering wall are formed as a single, continuous piece.

In some embodiments, the techniques described herein relate to a method, further including the step of placing a removable and washable mattress cover over the pet bed mattress.

According to some aspects, the techniques described herein relate to a method, wherein the mattress cover includes air-permeable fabric on the sides that allows air to flow in and out of the zig-zagging Z-shaped air valleys or channels.

In some embodiments, the techniques described herein relate to a method, wherein the zig-zagging Z-shaped air valleys or channels are arranged in a repeating pattern across the upper layer.

According to some aspects, the techniques described herein relate to a method, wherein the tapering walls are arranged in a parallel configuration, with each tapering wall separated by one of the zig-zagging Z-shaped air valleys or channels.

In some embodiments, the techniques described herein relate to a method, wherein the upper layer is made from a foam material including at least one of polyurethane foam, memory foam, gel-infused foam, latex foam, high-density foam, or an orthopedic foam.

According to some aspects, the techniques described herein relate to a method, wherein the three-dimensional (3D) sea wave appearance is provided by the zig-zagging Z-shape of each air channel and the tapering walls separating them.

In some embodiments, the techniques described herein relate to a method, wherein the three-dimensional (3D) sea wave appearance includes a unique surface pattern.

According to some aspects, the techniques described herein relate to a method, wherein the unique surface pattern of the three-dimensional (3D) sea wave appearance is provided by the upper layer.

In some embodiments, the techniques described herein relate to a pet bed mattress including a bottom foam support base and an upper layer including a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a three-dimensional (3D) sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress, the airflow being facilitated by the shape and arrangement of the zig-zagging Z-shaped air valleys or channels.

According to some aspects, the techniques described herein relate to a pet bed mattress, further including a mattress cover with air-permeable fabric on the sides that allows the comforting and cooling airflow underneath the pet when the mattress cover is placed over the pet bed mattress, the air-permeable fabric enabling air to flow in and out of the zig-zagging Z-shaped air valleys or channels.

In some embodiments, the techniques described herein relate to a pet bed mattress, wherein the upper layer includes a compressible foam material selected from the group consisting of polyurethane foam, memory foam, gel-infused foam, orthopedic cloudy gel memory foam, latex foam, high-density foam, orthopedic foam, viscoelastic foam, open-cell foam, closed-cell foam, and combinations thereof.

According to some aspects, the techniques described herein relate to a pet bed mattress, wherein the zig-zagging Z-shaped air valleys or channels are shaped to provide airflow for comfort and cooling, with the shape of the air valleys or channels facilitating the flow of air underneath the pet's body.

In some embodiments, the techniques described herein relate to a pet bed mattress, wherein the air-permeable fabric on the sides of the mattress cover includes at least one of a mesh material, a perforated material, a breathable synthetic fabric, a breathable natural fabric, or a moisture-wicking fabric, each of which allows air to flow through the fabric and into the zig-zagging Z-shaped air valleys or channels.

According to some aspects, the techniques described herein relate to a pet bed mattress, wherein the compressible material of the tapering wall is compressible by the weight of the pet's body, providing progressively greater support as the pet's body compresses the tapering wall.

In some embodiments, the techniques described herein relate to a pet bed mattress, wherein the shaped air channels of the zig-zagging Z-shaped air valleys or channels provide airflow for comfort and cooling to the pet, with the airflow being directed underneath the pet's body by the shape and arrangement of the air valleys or channels.

According to some aspects, the techniques described herein relate to a pet bed mattress, wherein the breathable material on the sides of the mattress cover allows airflow underneath the pet, facilitating the comforting and cooling airflow provided by the zig-zagging Z-shaped air valleys or channels.

In some embodiments, the techniques described herein relate to a pet bed mattress, wherein the bottom foam support base includes a supportive material selected from the group consisting of high-density foam, polyurethane foam, and orthopedic foam.

According to some aspects, the techniques described herein relate to a pet bed mattress, wherein the supportive material of the bottom foam support base provides support and comfort to the pet bed mattress, enhancing the overall comfort and support provided by the mattress.

In some embodiments, the techniques described herein relate to a method for placing a pet at comfortable rest, the method including the steps of: (1) obtaining a pet bed mattress including a bottom foam support base and an upper layer including a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a three-dimensional (3D) sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress, the airflow being facilitated by the shape and arrangement of the zig-zagging Z-shaped air valleys or channels; and (2) placing the pet upon the pet bed mattress and allowing the pet to feel the comforting and cooling airflow underneath the pet, the airflow being directed underneath the pet's body by the shape and arrangement of the zig-zagging Z-shaped air valleys or channels; whereby the pet rests comfortably on the mattress.

According to some aspects, the techniques described herein relate to a method, wherein the upper layer, the zig-zagging Z-shaped air valleys or channels, and the tapering wall are formed as a single, continuous piece using a molding process.

In some embodiments, the techniques described herein relate to a method, further including the step of placing a removable and washable mattress cover over the pet bed mattress, the mattress cover protecting the mattress from dirt, debris, and pet hair.

According to some aspects, the techniques described herein relate to a method, wherein the mattress cover includes air-permeable fabric on the sides that allows air to flow in and out of the zig-zagging Z-shaped air valleys or channels, facilitating the comforting and cooling airflow underneath the pet.

In some embodiments, the techniques described herein relate to a method, wherein the zig-zagging Z-shaped air valleys or channels are arranged in a repeating pattern across the upper layer, providing consistent airflow and support throughout the mattress.

According to some aspects, the techniques described herein relate to a method, wherein the tapering walls are arranged in a parallel configuration, with each tapering wall separated by one of the zig-zagging Z-shaped air valleys or channels, creating a uniform pattern of support and airflow.

In some embodiments, the techniques described herein relate to a method, wherein the upper layer is made from a foam material including at least one of polyurethane foam, memory foam, gel-infused foam, latex foam, high-density foam, orthopedic foam, orthopedic cloudy gel memory foam, viscoelastic foam, open-cell foam, closed-cell foam, or combinations thereof, each of which provides a combination of support, comfort, and durability.

According to some aspects, the techniques described herein relate to a method, wherein the three-dimensional (3D) sea wave appearance is provided by the zig-zagging Z-shape of each air channel and the tapering walls separating them, creating a visually appealing and unique surface pattern.

In some embodiments, the techniques described herein relate to a method, wherein the three-dimensional (3D) sea wave appearance includes a unique surface pattern that mimics the look of sea waves, providing an aesthetically pleasing appearance to the pet bed mattress.

According to some aspects, the techniques described herein relate to a method, wherein the unique surface pattern of the three-dimensional (3D) sea wave appearance is provided by the upper layer, which is formed using a molding process to create the zig-zagging Z-shaped air valleys or channels and tapering walls.

In some embodiments, the techniques described herein relate to a pet bed mattress assembly, including: an upper comfort layer including a plurality of zig-zagging Z-shaped air valleys or channels each separated by a tapering wall with a thinner top thickness and a thicker bottom thickness, wherein each tapering wall provides progressively greater support for a pet's body as each tapering wall is compressed by a weight of the pet's body, wherein the upper comfort layer provides a sea wave appearance due to a zig-zagging Z-shape of each zig-zagging Z-shaped air channel along with each separated by the tapering wall, and wherein each of the zig-zagging Z-shaped air valleys or channels provides a comforting and cooling airflow underneath the pet when the pet's body is lying on the upper comfort layer.

According to some aspects, the techniques described herein relate to a pet bed mattress assembly, further including: a bottom support layer; and a mattress cover, wherein the pet bed mattress assembly includes the bottom support layer and is provided with the mattress cover.

In some embodiments, the techniques described herein relate to a pet bed mattress assembly, wherein the mattress cover includes a mattress cover assembly that is placed over the pet bed mattress assembly and includes an air-permeable fabric on sides of the mattress cover, wherein the air-permeable fabric allows the comforting and cooling airflow underneath the pet when the mattress cover is placed over the pet bed mattress assembly.

According to some aspects, the techniques described herein relate to a pet bed mattress assembly, wherein the bottom support layer and/or the mattress cover includes a non-slip bottom layer operative to keep the pet bed mattress assembly from slipping on a floor when a pet moves onto the pet bed mattress assembly.

In some embodiments, the techniques described herein relate to a pet bed, wherein a three-dimensional (3D) wave-pattern is provided by a plurality of Z-shaped ventilation slots from the zig-zagging Z-shaped air valleys.

In any interpretation of the claims appended hereto, it is noted that no claims or claim elements are intended to invoke or be interpreted under 35 U.S.C. 112 (f) unless the words "means for" or "step for" are explicitly used in the particular claim.

In general, any combination of disclosed features, descriptions, claims, components and methods described herein is possible. Steps of a method can be performed in any order that is physically possible.

All cited references are incorporated by reference herein. Although embodiments have been disclosed, it is not desired to be limited thereby. Rather, the scope should be determined only by the appended claims.

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure. The methods, kits, formulations, and devices disclosed herein can be combined in any way into systems to address the current public health emergency.

The technology described herein is further illustrated by the following examples which in no way should be construed as being further limiting. The Examples are provided to demonstrate examples of future planned work, which in some experiments is emergency work. Although methods and materials similar or equivalent to those described herein can be used in the practice or testing of this disclosure, suitable methods and materials are described below.

EXAMPLES

The invention now being generally described with the spirit of the invention and inventive concept described and illustrated, it will be more readily understood by reference to the following examples which are included merely for purposes of illustration of certain aspects and embodiments of the present invention and are not intended to limit the invention. As can be discerned, the technology herein provides a great improvement in pet relaxation.

Example 1. Pet Relaxation Testing

A general list of descriptions was made to describe the technology. In some examples, the technology can be described by the following descriptions:

Description 1: A pet bed mattress including a bottom foam support base and an upper layer comprising a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a three-dimensional (3D) sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress, the airflow being facilitated by the shape and arrangement of the zig-zagging Z-shaped air valleys or channels.

Description 2: The pet bed mattress of description 1, further comprising a mattress cover with air-permeable fabric on the sides that allows the comforting and cooling airflow underneath the pet when the mattress cover is placed over the pet bed mattress, the air-permeable fabric enabling air to flow in and out of the zig-zagging Z-shaped air valleys or channels.

Description 3: The pet bed mattress of description 1, wherein the upper layer comprises a compressible foam material selected from the group consisting of polyurethane foam, memory foam, gel-infused foam, latex foam, high-density foam, orthopedic foam, viscoelastic foam, open-cell foam, closed-cell foam, and combinations thereof.

Description 4: The pet bed mattress of description 1, wherein the zig-zagging Z-shaped air valleys or channels are shaped to provide airflow for comfort and cooling, with the shape of the air valleys or channels facilitating the flow of air underneath the pet's body.

Description 5: The pet bed mattress of description 2, wherein the air-permeable fabric on the sides of the mattress cover comprises at least one of a mesh material, a perforated material, a breathable synthetic fabric, a breathable natural fabric, or a moisture-wicking fabric, each of which allows air to flow through the fabric and into the zig-zagging Z-shaped air valleys or channels.

Description 6: The pet bed mattress of description 3, wherein the compressible material of the tapering wall is compressible by the weight of the pet's body, providing progressively greater support as the pet's body compresses the tapering wall.

Description 7: The pet bed mattress of description 4, wherein the shaped air channels of the zig-zagging Z-shaped air valleys or channels provide airflow for comfort and cooling to the pet, with the airflow being directed underneath the pet's body by the shape and arrangement of the air valleys or channels.

Description 8: The pet bed mattress of description 5, wherein the breathable material on the sides of the mattress cover allows airflow underneath the pet, facilitating the comforting and cooling airflow provided by the zig-zagging Z-shaped air valleys or channels.

Description 9: The pet bed mattress of description 1, wherein the bottom foam support base comprises a supportive material selected from the group consisting of high-density foam, polyurethane foam, and orthopedic foam.

Description 10: The pet bed mattress of description 9, wherein the supportive material of the bottom foam support base provides support and comfort to the pet bed mattress, enhancing the overall comfort and support provided by the mattress.

Description 11: A method for placing a pet at comfortable rest, the method comprising the steps of: (1) obtaining a pet bed mattress including a bottom foam support base and an upper layer comprising a plurality of zig-zagging Z-shaped air valleys or channels each separated by a tapering wall with a thinner top thickness and a thicker bottom thickness so that each tapering wall provides progressively greater support for a pet's body as each tapering wall is compressed by the weight of the pet's body; wherein the upper layer provides a three-dimensional (3D) sea wave appearance due to a zig-zagging Z-shape of the each zig-zagging Z-shaped air channel along with each separated by the tapering wall; and wherein each of the zig-zagging Z-shaped air valleys or channels provides a comforting and cooling airflow underneath the pet when the pet's body is lying on the mattress, the airflow being facilitated by the shape and arrangement of the zig-zagging Z-shaped air valleys or channels; and (2) placing the pet upon the pet bed mattress and allowing the pet to feel the comforting and cooling airflow underneath the pet, the airflow being directed underneath the pet's body by the shape and arrangement of the zig-zagging Z-shaped air valleys or channels; whereby the pet rests comfortably on the mattress.

Description 12: The method of description 11, wherein the upper layer, the zig-zagging Z-shaped air valleys or channels, and the tapering wall are formed as a single, continuous piece using a molding process.

Description 13: The method of description 11, further comprising the step of placing a removable and washable mattress cover over the pet bed mattress, the mattress cover protecting the mattress from dirt, debris, and pet hair.

Description 14: The method of description 13, wherein the mattress cover includes air-permeable fabric on the sides that allows air to flow in and out of the zig-zagging Z-shaped air valleys or channels, facilitating the comforting and cooling airflow underneath the pet.

Description 15: The method of description 11, wherein the zig-zagging Z-shaped air valleys or channels are arranged in a repeating pattern across the upper layer, providing consistent airflow and support throughout the mattress.

Description 16: The method of description 11, wherein the tapering walls are arranged in a parallel configuration, with each tapering wall separated by one of the zig-zagging Z-shaped air valleys or channels, creating a uniform pattern of support and airflow.

Description 17: The method of description 11, wherein the upper layer is made from a foam material comprising at least one of polyurethane foam, memory foam, gel-infused foam, latex foam, high-density foam, orthopedic foam, viscoelastic foam, open-cell foam, closed-cell foam, or combinations thereof, each of which provides a combination of support, comfort, and durability.

Description 18: The method of description 11, wherein the three-dimensional (3D) sea wave appearance is provided by the zig-zagging Z-shape of each air channel and the tapering walls separating them, creating a visually appealing and unique surface pattern.

Description 19: The method of description 18, wherein the three-dimensional (3D) sea wave appearance comprises a unique surface pattern that mimics the look of sea waves, providing an aesthetically pleasing appearance to the pet bed mattress.

Description 20: The method of description 19, wherein the unique surface pattern of the three-dimensional (3D) sea wave appearance is provided by the upper layer, which is formed using a molding process to create the zig-zagging Z-shaped air valleys or channels and tapering walls.

Pets of various sizes and fur lengths are presented with each of the descriptions 1-10 above, and all pets immediately recline and relax upon the ped bed mattress (e.g., FIG. 2A, FIG. 2C, FIG. 2D, FIG. 3B). The methods of descriptions 11-20 are further confirmed (Example 2).

Example 2. Methods Testing

FIG. 6A illustrates, in a flowchart, the structure and function of a pet bed mattress with cooling airflow.

FIG. 6B (left), FIG. 6C (middle), and FIG. 6D (right) illustrate, in a combined flowchart, the components and features of the pet bed mattress for comfort and airflow.

In testing, in step 100 (FIG. 6A), the process begins with obtaining a pet bed mattress that includes a bottom foam support base and an upper layer. The upper layer comprises a plurality of zig-zagging Z-shaped air valleys or channels, each separated by a tapering wall with a thinner top thickness and a thicker bottom thickness. This design ensures that each tapering wall provides progressively greater support for a pet's body as it is compressed by the weight of the pet's body. The upper layer also provides a three-dimensional (3D) sea wave appearance due to the zig-zagging Z-shape of each air channel, which is separated by the tapering walls. This design not only enhances the aesthetic appeal of the mattress but also serves a functional purpose.

The zig-zagging Z-shaped air valleys or channels are designed to provide a comforting and cooling airflow underneath the pet when the pet's body is lying on the mattress. This airflow is facilitated by the shape and arrangement of the zig-zagging Z-shaped air valleys or channels. The upper layer, the zig-zagging Z-shaped air valleys, and the tapering wall are formed as a single, continuous piece using a molding process, ensuring structural integrity and uniformity.

The mattress cover, which is placed over the pet bed mattress, includes air-permeable fabric on the sides. This fabric allows air to flow in and out of the zig-zagging Z-shaped air valleys or channels, further facilitating the comforting and cooling airflow underneath the pet. The air-permeable fabric can be made from materials such as mesh, perforated material, breathable synthetic fabric, breathable natural fabric, or moisture-wicking fabric, each of which allows air to flow through the fabric and into the air valleys or channels.

The upper layer is made from a foam material that can include polyurethane foam, memory foam, gel-infused foam, latex foam, high-density foam, orthopedic foam, viscoelastic foam, open-cell foam, closed-cell foam, or combinations thereof. These materials provide a combination of support, comfort, and durability. The compressible material of the tapering wall is designed to be compressible by the weight of the pet's body, providing progressively greater support as the pet's body compresses the tapering wall.

The zig-zagging Z-shaped air valleys or channels are arranged in a repeating pattern across the upper layer, providing consistent airflow and support throughout the mattress. The tapering walls are arranged in a parallel configuration, with each tapering wall separated by one of the zig-zagging Z-shaped air valleys or channels, creating a uniform pattern of support and airflow.

The three-dimensional (3D) sea wave appearance is provided by the zig-zagging Z-shape of each air channel and the tapering walls separating them, creating a visually appealing and unique surface pattern. This surface pattern mimics the look of sea waves, providing an aesthetically pleasing appearance to the pet bed mattress. The upper layer, which is formed using a molding process, creates the zig-zagging Z-shaped air valleys or channels and tapering walls, ensuring a consistent and high-quality finish.

In step 102 (FIG. 6A, FIG. 6B, FIG. 6C, FIG. 6D), the process involves placing the pet upon the pet bed mattress and allowing the pet to feel the comforting and cooling airflow underneath the pet. This airflow is directed underneath the pet's body by the shape and arrangement of the zig-zagging Z-shaped air valleys or channels, ensuring that the pet rests comfortably on the mattress.

The pet bed mattress is designed to provide a comforting and cooling airflow underneath the pet when the pet's body is lying on the mattress. This is facilitated by the zig-zagging Z-shaped air valleys or channels, which are shaped to direct airflow underneath the pet's body. The upper layer of the mattress, which includes these air valleys or channels, is formed as a single, continuous piece using a molding process. This ensures that the structure is robust and maintains its shape over time.

Additionally, the mattress cover, which is placed over the pet bed mattress, includes air-permeable fabric on the sides. This fabric allows air to flow in and out of the zig-zagging Z-shaped air valleys or channels, further facilitating the comforting and cooling airflow underneath the pet. The mattress cover also serves to protect the mattress from dirt, debris, and pet hair, ensuring that the mattress remains clean and hygienic.

The zig-zagging Z-shaped air valleys or channels are arranged in a repeating pattern across the upper layer, providing consistent airflow and support throughout the mattress. This arrangement ensures that the pet experiences uniform comfort and cooling regardless of where they lie on the mattress. The tapering walls, which separate each of the zig-zagging Z-shaped air valleys or channels, are arranged in a parallel configuration. This creates a uniform pattern of support and airflow, enhancing the overall comfort provided by the mattress.

The upper layer of the mattress is made from a foam material that can include polyurethane foam, memory foam, gel-infused foam, latex foam, high-density foam, orthopedic foam, viscoelastic foam, open-cell foam, closed-cell foam, or combinations thereof. These materials are chosen for their ability to provide a combination of support, comfort, and durability. The three-dimensional (3D) sea wave appearance of the upper layer, created by the zig-zagging Z-shape of each air channel and the tapering walls separating them, adds a visually appealing and unique surface pattern to the mattress. This surface pattern mimics the look of sea waves, providing an aesthetically pleasing appearance to the pet bed mattress.

In summary, step 102 involves placing the pet on a well-designed pet bed mattress that provides both comfort and cooling through its structure and materials. The mattress cover with air-permeable fabric enhances this effect by allowing airflow, while also protecting the mattress from external contaminants. The consistent pattern of the air valleys and the use of foam materials ensure that the pet experiences comfort and support.

In sub-step 102-*a* (FIG. 6B, FIG. 6C), the upper layer, the zig-zagging Z-shaped air valleys or channels, and the tapering wall are formed as a single, continuous piece using a molding process. The upper layer comprises a plurality of zig-zagging Z-shaped air valleys or channels, each separated by a tapering wall with a thinner top thickness and a thicker bottom thickness. This design ensures that each tapering wall provides progressively greater support for a pet's body as each tapering wall is compressed by the weight of the pet's body. The upper layer provides a sea wave appearance due to the zig-zagging Z-shape of each zig-zagging Z-shaped air channel, along with each separated by the tapering wall. This sea wave appearance creates a visually appealing and unique surface pattern that mimics the look of sea waves, providing an aesthetically pleasing appearance to the pet bed mattress.

The zig-zagging Z-shaped air valleys or channels are designed to provide a comforting and cooling airflow underneath the pet when the pet's body is lying on the mattress. This airflow is facilitated by the shape and arrangement of the zig-zagging Z-shaped air valleys or channels, ensuring that the pet remains comfortable and cool. The upper layer, the zig-zagging Z-shaped air valleys or channels, and the tapering wall being formed as a single, continuous piece using a molding process ensures structural integrity and uniformity in the mattress design. This single-piece construction enhances the durability and longevity of the pet bed mattress, making it a reliable and comfortable resting place for pets.

In sub-step 102-*b*, the process involves placing a removable and washable mattress cover over the pet bed mattress. The mattress cover serves to protect the mattress from dirt, debris, and pet hair. The pet bed mattress itself is designed to provide a comforting and cooling airflow underneath the pet when the pet's body is lying on the mattress. This airflow is facilitated by the shape and arrangement of the zig-zagging Z-shaped air valleys or channels.

The mattress cover is equipped with air-permeable fabric on the sides, which allows the comforting and cooling airflow underneath the pet when the mattress cover is placed over the pet bed mattress. The air-permeable fabric enables air to flow in and out of the zig-zagging Z-shaped air valleys or channels, ensuring that the pet remains comfortable and cool. The air-permeable fabric on the sides of the mattress cover can be made from materials such as mesh material, perforated material, breathable synthetic fabric, breathable natural fabric, or moisture-wicking fabric, each of which allows air to flow through the fabric and into the zig-zagging Z-shaped air valleys or channels.

The pet bed mattress includes a bottom foam support base and an upper layer comprising a plurality of zig-zagging Z-shaped air valleys or channels, each separated by a tapering wall with a thinner top thickness and a thicker bottom thickness. Each tapering wall provides progressively greater support for a pet's body as each tapering wall is compressed by the weight of the pet's body. The upper layer provides a sea wave appearance due to the zig-zagging Z-shape of each zig-zagging Z-shaped air channel, along with each separated by the tapering wall. The zig-zagging Z-shaped air valleys or channels are arranged in a repeating pattern across the upper layer, providing consistent airflow and support throughout the mattress. The tapering walls are arranged in a parallel configuration, with each tapering wall separated by one of the zig-zagging Z-shaped air valleys or channels, creating a uniform pattern of support and airflow.

The upper layer, the zig-zagging Z-shaped air valleys or channels, and the tapering wall are formed as a single, continuous piece using a molding process. The upper layer is made from a foam material comprising at least one of polyurethane foam, memory foam, gel-infused foam, latex foam, high-density foam, orthopedic foam, viscoelastic foam, open-cell foam, closed-cell foam, or combinations thereof, each of which provides a combination of support, comfort, and durability. The three-dimensional (3D) sea wave appearance is provided by the zig-zagging Z-shape of each air channel and the tapering walls separating them, creating a visually appealing and unique surface pattern that mimics the look of sea waves, providing an aesthetically pleasing appearance to the pet bed mattress.

In sub-step 102-*c* (FIG. 6B, FIG. 6C), the mattress cover includes air-permeable fabric on the sides that allows air to flow in and out of the zig-zagging Z-shaped air valleys or channels, facilitating the comforting and cooling airflow underneath the pet.

The mattress cover, as described, allows the comforting and cooling airflow underneath the pet when the mattress cover is placed over the pet bed mattress. This is achieved through the air-permeable fabric on the sides of the mattress cover, which enables air to flow in and out of the zig-zagging Z-shaped air valleys or channels. The air-permeable fabric can be made from materials such as mesh material, perforated material, breathable synthetic fabric, breathable natural fabric, or moisture-wicking fabric, each of which allows air to flow through the fabric and into the zig-zagging Z-shaped air valleys or channels.

The zig-zagging Z-shaped air valleys or channels provide a comforting and cooling airflow underneath the pet when the pet's body is lying on the mattress. This airflow is facilitated by the shape and arrangement of the zig-zagging Z-shaped air valleys or channels, which are designed to provide consistent airflow and support throughout the mattress. The upper layer of the mattress, which includes these air valleys or channels, is made from a foam material that can include polyurethane foam, memory foam, gel-infused foam, latex foam, high-density foam, orthopedic foam, viscoelastic foam, open-cell foam, closed-cell foam, or combinations thereof. This foam material provides a combination of support, comfort, and durability.

The tapering walls that separate each of the zig-zagging Z-shaped air valleys or channels have a thinner top thickness and a thicker bottom thickness, providing progressively greater support for a pet's body as each tapering wall is compressed by the weight of the pet's body. This design ensures that the pet bed mattress not only provides comfort and cooling through airflow but also offers the necessary support for the pet's body.

In summary, sub-step 102-*c* highlights the role of the mattress cover with air-permeable fabric in facilitating the airflow through the zig-zagging Z-shaped air valleys or channels, thereby enhancing the comfort and cooling effect for the pet. The combination of materials and design elements ensures that the pet bed mattress provides both support and comfort, making it a suitable resting place for pets.

In step 102-*d* (FIG. 6C), the zig-zagging Z-shaped air valleys or channels are arranged in a repeating pattern across the upper layer, providing consistent airflow and support throughout the mattress. The upper layer comprises a plurality of zig-zagging Z-shaped air valleys or channels each separated by a tapering wall with a thinner top thickness and a thicker bottom thickness. This design ensures that each tapering wall provides progressively greater support for a pet's body as each tapering wall is compressed by the weight of the pet's body. The upper layer provides a sea wave appearance due to a zig-zagging Z-shape of each zig-zagging Z-shaped air channel along with each separated by the tapering wall. Each of the zig-zagging Z-shaped air valleys or channels provides a comforting and cooling airflow underneath the pet when the pet's body is lying on the mattress. The airflow is facilitated by the shape and arrangement of the zig-zagging Z-shaped air valleys or channels, ensuring that the pet rests comfortably on the mattress. The upper layer, the zig-zagging Z-shaped air valleys or channels, and the tapering wall are formed as a single, continuous piece using a molding process, creating a uniform and integrated structure. This arrangement not only enhances the aesthetic appeal of the mattress by providing a three-dimensional sea wave appearance but also ensures consistent airflow and support throughout the mattress, contributing to the overall comfort and cooling effect for the pet.

In step 102-*e*, the tapering walls are arranged in a parallel configuration, with each tapering wall separated by one of the zig-zagging Z-shaped air valleys or channels, creating a uniform pattern of support and airflow. The tapering walls provide progressively greater support for a pet's body as each tapering wall is compressed by the weight of the pet's body. This arrangement ensures that the pet bed mattress offers consistent support and comfort to the pet, enhancing the overall effectiveness of the mattress.

The zig-zagging Z-shaped air valleys or channels are designed to provide a comforting and cooling airflow underneath the pet when the pet's body is lying on the mattress. The shape and arrangement of these air valleys or channels facilitate the flow of air, ensuring that the pet remains cool and comfortable. The attributes of the zig-zagging Z-shaped air valleys or channels include their ability to provide consistent airflow and support throughout the mattress, which is crucial for maintaining the pet's comfort.

The tapering walls, with their thinner top thickness and thicker bottom thickness, are integral to the mattress's design. They are compressible by the weight of the pet's body, providing progressively greater support as the pet's body compresses the tapering wall. This feature ensures that the mattress adapts to the pet's body, offering tailored support and comfort.

Overall, the parallel configuration of the tapering walls and the arrangement of the zig-zagging Z-shaped air valleys or channels work together to create a uniform pattern of support and airflow. This design not only enhances the pet's comfort but also ensures that the mattress provides consistent support and cooling, making it a suitable choice for pet owners looking for a high-quality pet bed mattress.

In sub-step 102-*f* (FIG. 6C), the focus is on the upper layer of the pet bed mattress, which is made from a foam material. The foam material is selected from a group consisting of polyurethane foam, memory foam, gel-infused foam, latex foam, high-density foam, orthopedic foam, viscoelastic foam, open-cell foam, closed-cell foam, or combinations thereof. This selection of materials provides a combination of support, comfort, and durability. The upper layer, comprising a plurality of zig-zagging Z-shaped air valleys or channels each separated by a tapering wall with a thinner top thickness and a thicker bottom thickness, is designed to provide progressively greater support for a pet's body as each tapering wall is compressed by the weight of the pet's body. This structure ensures that the pet bed mattress offers both comfort and support, adapting to the pet's body weight and shape.

The upper layer also provides a sea wave appearance due to the zig-zagging Z-shape of each zig-zagging Z-shaped air channel, along with each separated by the tapering wall. This design not only enhances the aesthetic appeal of the mattress but also contributes to its functionality. The zig-zagging Z-shaped air valleys or channels facilitate a comforting and cooling airflow underneath the pet when the pet's body is lying on the mattress. This airflow is crucial for maintaining a comfortable temperature for the pet, especially during warmer conditions.

Additionally, the upper layer, the zig-zagging Z-shaped air valleys or channels, and the tapering wall are formed as a single, continuous piece using a molding process. This manufacturing technique ensures the integrity and durability of the mattress, providing a seamless and robust structure that can withstand the weight and movement of the pet over time.

In summary, sub-step 102-*f* highlights the importance of the upper layer's material composition and structural design in providing a pet bed mattress that offers a combination of support, comfort, and durability, while also facilitating a cooling airflow and maintaining an aesthetically pleasing appearance.

In step 102-*g* (FIG. 6D, FIG. 6C), the three-dimensional (3D) sea wave appearance is provided by the zig-zagging Z-shape of each air channel and the tapering walls separating them, creating a visually appealing and unique surface pattern. The upper layer provides a sea wave appearance due to a zig-zagging Z-shape of each zig-zagging Z-shaped air channel along with each separated by the tapering wall. This design not only enhances the aesthetic appeal of the pet bed mattress but also contributes to its functional attributes. The tapering walls, which have a thinner top thickness and a thicker bottom thickness, provide progressively greater support for a pet's body as each tapering wall is compressed by the weight of the pet's body. This ensures that the pet experiences optimal comfort and support while lying on the mattress.

The zig-zagging Z-shaped air channels are integral to the mattress's design, facilitating a comforting and cooling airflow underneath the pet. This airflow is directed underneath the pet's body by the shape and arrangement of the zig-zagging Z-shaped air valleys or channels, ensuring that the pet remains cool and comfortable. The upper layer, comprising these air channels and tapering walls, is formed as a single, continuous piece using a molding process, which ensures the durability and integrity of the mattress structure.

Additionally, the mattress cover, which includes air-permeable fabric on the sides, allows air to flow in and out of the zig-zagging Z-shaped air valleys or channels, further enhancing the cooling effect. This fabric can be made from materials such as mesh, perforated material, breathable synthetic fabric, breathable natural fabric, or moisture-wicking fabric, each of which allows air to flow through the fabric and into the air valleys or channels.

Overall, the combination of the three-dimensional (3D) sea wave appearance, the zig-zagging Z-shaped air channels, and the tapering walls creates a pet bed mattress that is not only visually appealing but also highly functional, providing comfort, support, and cooling airflow for the pet.

In step 102-*h* (FIG. 6D), the focus is on the three-dimensional (3D) sea wave appearance and the unique surface pattern of the pet bed mattress.

The three-dimensional (3D) sea wave appearance comprises a unique surface pattern that mimics the look of sea waves, providing an aesthetically pleasing appearance to the pet bed mattress. This surface pattern is achieved through the design of the upper layer, which includes a plurality of zig-zagging Z-shaped air valleys or channels each separated by a tapering wall. The tapering walls have a thinner top thickness and a thicker bottom thickness, which not only contribute to the visual appeal but also provide progressively greater support for a pet's body as each tapering wall is compressed by the weight of the pet's body.

The upper layer provides a sea wave appearance due to a zig-zagging Z-shape of each zig-zagging Z-shaped air channel along with each separated by the tapering wall. This design element creates a visually appealing and unique surface pattern that enhances the overall aesthetic of the pet bed mattress. The zig-zagging Z-shaped air valleys or channels are arranged in a repeating pattern across the upper layer, providing consistent airflow and support throughout the mattress. This arrangement ensures that the pet experiences a comforting and cooling airflow underneath its body when lying on the mattress, facilitated by the shape and arrangement of the zig-zagging Z-shaped air valleys or channels.

The tapering walls are arranged in a parallel configuration, with each tapering wall separated by one of the zig-zagging Z-shaped air valleys or channels, creating a uniform pattern of support and airflow. This configuration ensures that the pet bed mattress provides a combination of support, comfort, and durability. The upper layer is made from a foam material comprising at least one of polyurethane foam, memory foam, gel-infused foam, latex foam, high-density foam, orthopedic foam, viscoelastic foam, open-cell foam, closed-cell foam, or combinations thereof, each of which provides a combination of support, comfort, and durability.

In summary, step 102-*h* highlights the intricate design and functional aspects of the pet bed mattress, emphasizing the three-dimensional (3D) sea wave appearance and the unique surface pattern that enhance the visual appeal and contribute to the overall comfort and support provided to the pet.

In step 102-*i*, the unique surface pattern of the three-dimensional (3D) sea wave appearance is provided by the upper layer, which is formed using a molding process to create the zig-zagging Z-shaped air valleys or channels and tapering walls. The upper layer provides a sea wave appearance due to a zig-zagging Z-shape of each zig-zagging Z-shaped air channel along with each separated by the tapering wall. This surface pattern mimics the look of sea waves, providing an aesthetically pleasing appearance to the pet bed mattress. The upper layer, the zig-zagging Z-shaped air valleys, and the tapering walls are formed as a single, continuous piece using a molding process. This process ensures that the upper layer, with its intricate design, is seamlessly integrated, enhancing both the structural integrity and the visual appeal of the mattress. The tapering walls, with a thinner top thickness and a thicker bottom thickness, provide progressively greater support for a pet's body as each tapering wall is compressed by the weight of the pet's body. This design ensures optimal support and comfort for the pet. The zig-zagging Z-shaped air valleys or channels facilitate a comforting and cooling airflow underneath the pet when the pet's body is lying on the mattress. This airflow is directed underneath the pet's body by the shape and arrangement of the air valleys or channels, ensuring that the pet remains cool and comfortable. The combination of these features makes the pet bed mattress both functional and visually appealing, providing a unique and comfortable resting place for pets.

Further durability testing of the mattress is underway using different pets.

REFERENCES

[1.] IUPAC. International Union of Pure and Applied Chemistry GoldBook. https://goldbook.iupac.org/.

[2.] Merriam-Webster's Online Dictionary. https://www.merriam-webster.com/.

[3.] Porter R. S., & Kaplan, J. L. (Eds.). *The Merck manual of diagnosis and therapy* (19th ed.). Merck Sharp & Dohme Corp . . . 2011, (978-0-911910-19-3).

[4.] Robert S. Porter et al., (eds.). *The Encyclopedia of Molecular Cell Biology and Molecular Medicine*. Blackwell Science Ltd.; 1999-2012, (9783527600908).

[5.] Robert A. Meyers (ed.). *Molecular Biology and Biotechnology: A Comprehensive Desk Reference*. VCH Publishers, Inc.; 1995, (1-56081-569-8).

[6.] Luttmann Werner. *Immunology*. Elsevier; 2006,

[7.] Kenneth Murphy Allan Mowat, Casey Weaver (eds.). *Janeway's Immunobiology*. Taylor & Francis Limited; 2014, (9780815345305).

[8.] Krebs Jocelyn E., et al. *Lewin's genes XI*. 11th ed. Burlington, Mass.: Jones & Bartlett Learning; 2014, (1449659055).

9. Green Michael R. *Molecular cloning: a laboratory manual*/Michael R. Green, Joseph Sambrook. Cold Spring Harbor, N.Y: Cold Spring Harbor Laboratory Press; 2012, (1936113414).

10. Davis et al. *Basic Methods in Molecular Biology*. Elsevier Science Publishing, Inc.; 2012, (044460149X).

11. Jon Lorsch (ed.). *Laboratory Methods in Enzymology: DNA*. Elsevier; 2013, (0124199542).

12. Frederick M. Ausubel (ed.). *Current Protocols in Molecular Biology* (CPMB). John Wiley and Sons 2014, (9780471503385).

13. John E. Coligan (ed.). *Current Protocols in Protein Science* (CPPS). John Wiley and Sons, Inc.; 2005, 14. John E. Coligan A D A M Kruisbeek, David H Margulies, Ethan M Shevach, Warren Strobe, (eds.) *Current Protocols in Immunology* (CPI). John Wiley and Sons, Inc.; 2003, (9780471142737).

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The foregoing written specification and figures are considered to be sufficient to enable one skilled in the art to practice the present aspects and embodiments. The present aspects and embodiments are not to be limited in scope by examples provided, since the examples are intended as a single illustration of one aspect and other functionally equivalent embodiments are within the scope of the disclosure. Various modifications in addition to those shown and described herein will become apparent to those skilled in the art from the foregoing description and fall within the scope of the appended claims. The advantages and objects described herein are not necessarily encompassed by each embodiment. Those skilled in the art will recognize or be able to ascertain using no more than routine experimentation, many equivalents to the specific embodiments described herein. Such equivalents are intended to be encompassed by the following exemplary claims.

I claim:

1. A pet bed mattress comprising
(a) a foam support base having opposed side edges and a top surface;
(b) an upper layer disposed on and supported by the support base, the upper layer being a single continuous piece of compressible foam and having a contoured top surface with alternating ridges and valleys separated by tapering walls, each tapering wall extending upwardly from the top surface of the support base to terminate at a ridge and having a crest thickness that is less than a root thickness so that each tapering wall provides progressively greater support when compressed under load such as for a pet's body as each tapering wall is compressed by the weight of the pet's body;
(c) the geometry of the upper layer and the support base defines a plurality of internal, undulating airflow channels that extend in a horizontal direction between the opposed side edges, each airflow channel being bounded between the top surface of the support base and an underside region of the upper layer located beneath the valleys of the contoured top surface and being separated by the tapering walls;
(d) at least one of the airflow channels extends continuously from a first side edge to an opposite side edge;
(e) the airflow channels cooperating to define a serpentine horizontal airflow path that conducts airflow laterally from one side edge of the mattress to the other when the mattress is compressed under load; and
(f) the airflow channels being non-continuous in a vertical direction such that no uninterrupted airflow channel extends from the contoured top surface of the upper layer to the top surface of the support base.

2. The pet bed mattress of claim 1, further comprising a removable mattress cover having opposed side panels formed of an air-permeable fabric on the sides, the cover overlying the upper layer and permitting airflow between the airflow channels and ambient air.

3. The pet bed mattress of claim 1, wherein the upper layer, the airflow channels and the tapering walls are produced in a single molding step.

4. The pet bed mattress of claim 1, wherein the support base is formed of a foam material having a density greater than a density of the upper layer.

5. The pet bed mattress of claim 2, wherein the air-permeable fabric comprises at least one of a mesh knit, a perforated woven textile, a breathable synthetic fabric, a breathable natural fabric, or a moisture-wicking fabric.

6. The pet bed mattress of claim 3, wherein the compressible foam of the upper layer includes a gradient of foam content that increases toward the bottom of the airflow channels.

7. The pet bed mattress of claim 1, wherein the serpentine airflow path includes at least two directional reversals along its length.

8. The pet bed mattress of claim 4, wherein the support base includes a non-skid lower surface.

9. The pet bed mattress of claim 1, wherein the upper layer comprises at least one of polyurethane foam, memory foam, gel-infused foam, latex foam, high-density foam, or viscoelastic foam.

10. The pet bed mattress of claim 1, wherein the tapering walls are arranged in substantially parallel rows separated by the airflow channels to provide a uniform pattern of support and airflow across the mattress.

11. A method of providing convective cooling airflow to a pet, the method comprising the steps 1-3 below:
(1) obtaining a pet bed mattress comprising:
(a) a foam support base having opposed side edges and a top surface;
(b) an upper layer disposed on and supported by the support base, the upper layer being a single continuous piece of compressible foam and having a contoured top surface with alternating ridges and valleys separated by tapering walls, each tapering wall extending upwardly from the top surface of the support base to terminate at a ridge and having a crest thickness that is less than a root thickness so that each tapering wall provides progressively greater support when compressed under load such as for a pet's body as each tapering wall is compressed by the weight of the pet's body;
(c) the geometry of the upper layer and the support base defines a plurality of internal, undulating airflow channels that extend in a horizontal direction between the opposed side edges, each airflow channel being bounded between the top surface of the support base and an underside region of the upper layer located beneath the valleys of the contoured top surface and being separated by the tapering walls;

(d) at least one of the airflow channels extends continuously from a first side edge to an opposite side edge;

(e) the airflow channels cooperating to define a serpentine horizontal airflow path that conducts airflow laterally from one side edge of the mattress to the other when the mattress is compressed under load; and (f) the airflow channels being non-continuous in a vertical direction such that no uninterrupted airflow channel extends from the contoured top surface of the upper layer to the top surface of the support base;

(2) placing the pet bed mattress on a support surface with the airflow channels accessible to ambient air at the opposed side edges; and (3) allowing a pet to lie on the upper layer such that compression of the tapering walls drives air through the serpentine airflow path beneath the pet.

12. The method of claim 11, further comprising, before step (3), placing over the pet bed mattress a removable mattress cover having opposed side panels formed of an air-permeable fabric, the cover permitting airflow between the airflow channels and ambient air at the opposed side edges; wherein the airflow channels are closed at the contoured top surface by the underside of the upper layer.

13. The method of claim 12, further comprising periodically washing and replacing the removable mattress cover.

14. The method of claim 12, wherein the mattress cover includes a cooling airflow positioned adjacent to the upper layer.

15. The method of claim 11, wherein the airflow channels are arranged in a lattice of intersecting serpentine channels to provide substantially uniform airflow across an entire plan area of the mattress.

16. The method of claim 11, wherein the tapering walls are arranged in substantially parallel rows separated by the airflow channels.

17. The method of claim 11, wherein the upper layer is formed of a compressible foam selected from polyurethane foam, gel-infused memory foam, latex foam, and combinations thereof.

18. The method of claim 11, wherein the contoured top surface comprises alternating ridges and valleys arranged in a repeating pattern having substantially uniform crest-to-crest spacing across the mattress.

19. The method of claim 18, wherein adjacent ridges and valleys together define a continuous waveform profile along the length of the upper layer.

20. The method of claim 19, wherein the upper layer, the airflow channels, and the tapering walls are produced in a single molding step.

\* \* \* \* \*